United States Patent
Csik et al.

(10) Patent No.: US 8,177,466 B2
(45) Date of Patent: May 15, 2012

(54) APPARATUS AND METHODS FOR FASTENING A PANEL OR OTHER COMPONENTS

(75) Inventors: Terrence Csik, Pasadena, CA (US); Igor Komsitsky, Los Angeles, CA (US); Frank Read, Redmond, WA (US)

(73) Assignee: The Monadnock Company, City of Industry, CA (US)

( * ) Notice: Subject to any disclaimer, the term of this patent is extended or adjusted under 35 U.S.C. 154(b) by 570 days.

(21) Appl. No.: 11/762,757

(22) Filed: Jun. 13, 2007

(65) Prior Publication Data

US 2008/0310931 A1 Dec. 18, 2008

(51) Int. Cl.
*F16B 37/04* (2006.01)

(52) U.S. Cl. .......................... 411/174; 411/970

(58) Field of Classification Search .............. 411/174, 411/175, 112, 970
See application file for complete search history.

(56) References Cited

U.S. PATENT DOCUMENTS

| | | | |
|---|---|---|---|
| 910,712 A | 1/1909 | McCoy | |
| 2,144,350 A | 1/1939 | Swanstrom | |
| 2,144,553 A | 1/1939 | Oliver | |
| 2,159,573 A * | 5/1939 | Tinnerman | 411/112 |
| 2,344,102 A | 3/1944 | Meisterhans | |
| 2,381,233 A * | 8/1945 | Summers | 411/84 |
| 2,409,209 A | 10/1946 | Johnson | |
| 2,421,278 A | 5/1947 | Luce | |
| 2,469,311 A | 5/1949 | Poupitch | |
| 2,477,429 A | 7/1949 | Swanstrom et al. | |
| 2,552,499 A * | 5/1951 | Tinnerman | 411/112 |
| 2,633,886 A * | 4/1953 | Tinnerman | 411/112 |
| 2,875,805 A * | 3/1959 | Flora | 411/111 |
| 2,991,816 A | 7/1961 | Harbison et al. | |
| 3,009,499 A * | 11/1961 | Weihe | 411/112 |
| 3,020,946 A | 2/1962 | Mills | |
| 3,217,772 A | 11/1965 | Adams | |
| 3,219,086 A | 11/1965 | Zahodiakin | |
| 3,259,165 A | 7/1966 | Tobian et al. | |
| 3,356,404 A | 12/1967 | Peters | |
| 3,478,801 A | 11/1969 | Van Niel | |
| 3,670,796 A * | 6/1972 | Grimm | 411/112 |
| 3,700,020 A | 10/1972 | Wallace | |
| 4,094,352 A | 6/1978 | Hlinsky | |
| 4,193,435 A | 3/1980 | Frosch et al. | |

(Continued)

FOREIGN PATENT DOCUMENTS

CH 482 929 12/1969

(Continued)

OTHER PUBLICATIONS

WIPO, Notification of Transmittal of ISR and Written Opinion of ISA, Search Report, PCT/US2008/083287, Jan. 14, 2009.

(Continued)

*Primary Examiner* — Flemming Saether
(74) *Attorney, Agent, or Firm* — Henricks, Slavin & Holmes LLP

(57) ABSTRACT

Fasteners such as clip nut fasteners can include a clip having a nut cage and a nut supported by the nut cage. The nut cage can have a wall supporting a portion of the nut wherein the wall can flex toward and away from the nut. The nut can have projections or other discontinuities for engaging bearing surfaces in the nut cage, for limiting rotation of the nut when under torque.

31 Claims, 15 Drawing Sheets

U.S. PATENT DOCUMENTS

| | | | |
|---|---|---|---|
| 4,219,064 A | | 8/1980 | Lozano |
| 4,676,706 A | * | 6/1987 | Inaba ............................ 411/175 |
| 4,695,212 A | | 9/1987 | Berecz |
| 4,730,967 A | | 3/1988 | Warkentin |
| 4,755,090 A | | 7/1988 | Macfee et al. |
| 4,768,907 A | | 9/1988 | Gauron |
| 4,863,327 A | | 9/1989 | Poupiter |
| 4,895,484 A | | 1/1990 | Wilcox |
| 4,973,208 A | | 11/1990 | Gauron |
| 5,022,804 A | | 6/1991 | Peterson |
| 5,067,863 A | | 11/1991 | Kowalski |
| 5,154,385 A | | 10/1992 | Lindberg et al. |
| 5,190,423 A | | 3/1993 | Ewing |
| 5,193,868 A | | 3/1993 | O'Toole |
| 5,245,743 A | | 9/1993 | Landy et al. |
| 5,324,146 A | | 6/1994 | Parenti et al. |
| 5,378,099 A | | 1/1995 | Gauron |
| 5,489,173 A | | 2/1996 | Hofle |
| 5,507,610 A | | 4/1996 | Benedetti et al. |
| 5,624,319 A | * | 4/1997 | Golczyk et al. ................. 470/21 |
| 5,630,686 A | | 5/1997 | Billmann |
| 5,632,582 A | | 5/1997 | Gauron |
| 5,716,178 A | | 2/1998 | Vu |
| 5,820,322 A | | 10/1998 | Hermann et al. |
| 5,893,694 A | * | 4/1999 | Wilusz et al. ................. 411/112 |
| 5,928,711 A | | 7/1999 | Wallace et al. |
| 5,947,518 A | | 9/1999 | Redman et al. |
| 6,146,071 A | | 11/2000 | Norkus et al. |
| 6,474,917 B2 | | 11/2002 | Gauron |
| 6,726,117 B2 | | 4/2004 | Herb et al. |
| 6,854,941 B2 | * | 2/2005 | Csik ............................ 411/112 |
| 6,872,038 B2 | | 3/2005 | Westlake |
| 6,918,725 B2 | | 7/2005 | Gauron |
| 7,044,701 B2 | | 5/2006 | Herb |
| 7,052,222 B2 | | 5/2006 | Muller et al. |
| 7,101,131 B2 | | 9/2006 | Herb |
| 7,128,511 B2 | | 10/2006 | Hewgill |
| 7,192,231 B2 | | 3/2007 | Blackaby |
| 7,309,200 B2 | | 12/2007 | Schmieder et al. |
| 2004/0013492 A1 | | 1/2004 | Clinch et al. |
| 2004/0165943 A1 | | 8/2004 | Herb |
| 2004/0165965 A1 | | 8/2004 | Unverzagt et al. |
| 2004/0202523 A1 | | 10/2004 | Csik |
| 2009/0103997 A1 | | 4/2009 | Csik et al. |
| 2009/0129885 A1 | | 5/2009 | Csik et al. |

FOREIGN PATENT DOCUMENTS

| | | |
|---|---|---|
| GB | 565192 | 10/1944 |
| GB | 585948 | 3/1947 |
| GB | 782428 | 9/1957 |
| JP | 2006-38201 | 2/2006 |

OTHER PUBLICATIONS

WIPO, Notification of Transmittal of ISR and Written Opinion of ISA, Search Report, PCT/US2008/066792, Sep. 16, 2008.

* cited by examiner

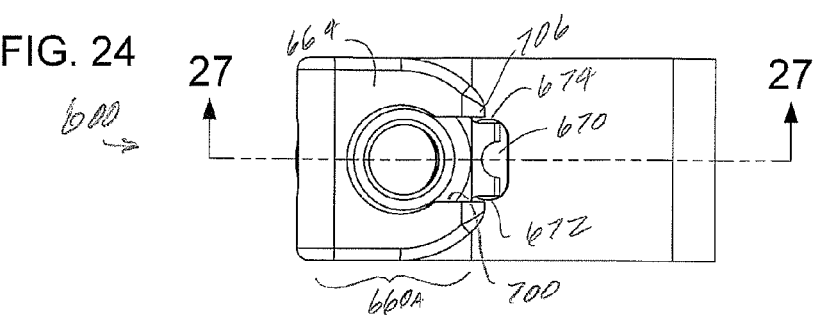
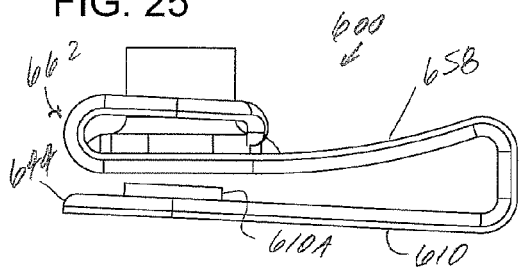
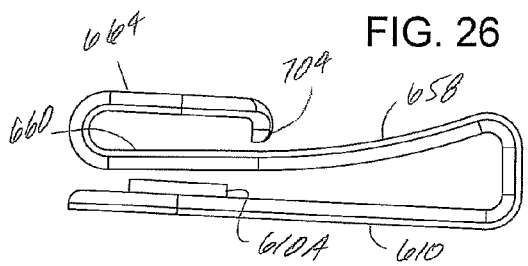
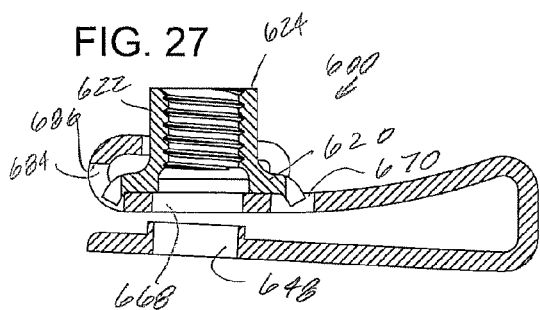
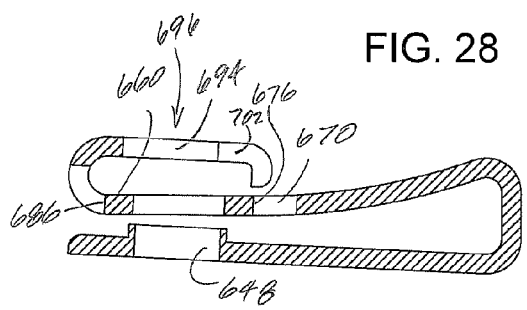
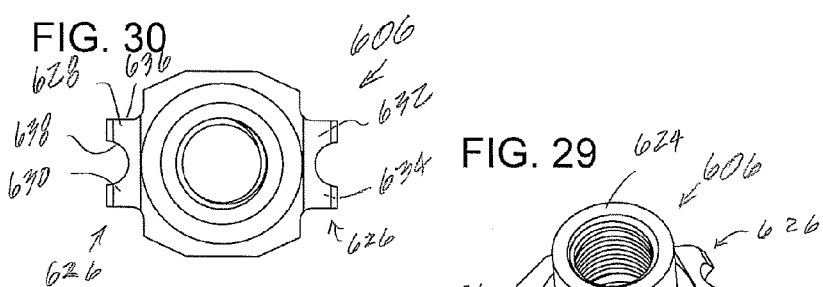
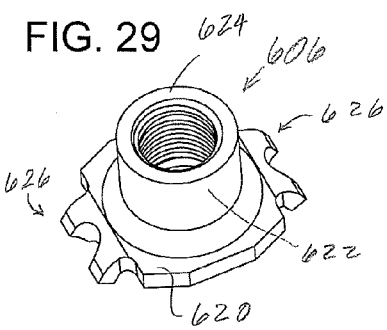
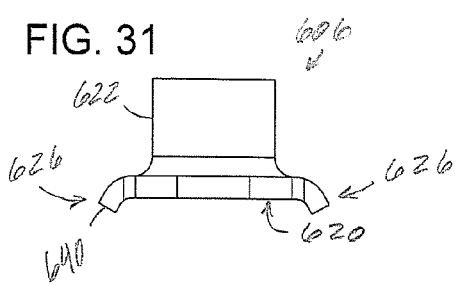

APPARATUS AND METHODS FOR FASTENING A PANEL OR OTHER COMPONENTS

BACKGROUND

1. Field

This relates to fasteners, for example clip nut fasteners, nut cages and similar assemblies, methods of forming fasteners, methods of assembling fasteners, methods of securing panels and other components with fasteners and assemblies using such fasteners.

2. Related Art

Clip nuts are typically configured to slide over an edge of a panel to align a nut with a hole formed in the panel. The nut receives a bolt, screw or other threaded element passed through the hole and threaded into the nut. Various such clip nuts may be used to mount items to the panel or for securing panels together. Clip nuts may be used in automobiles, appliances and aircraft, as well as in other applications. Also, a given application may call for a large number of clip nuts. For example, in assembling a single commercial aircraft hundreds of thousands of clip nuts can be used.

Depending on the configuration, some clip nuts can mar the panel, for example on installation or during normal use. Some may also require relatively significant assembly and installation time, and some may not have sufficient strength to reliably secure and maintain the nut under high loads. Therefore, a number of considerations can be involved in selecting and using available clip nuts.

SUMMARY

Fastener assemblies can be made that are lightweight, easy to assemble, and/or have a high load capability. A fastener assembly can also be made such that it is easier to maintain, as well as to allow easier maintenance of hardware secured by the fastener assembly. In one example of a fastener assembly, for example a nut assembly, a nut includes a plurality of projections, any one of which make the perimeter of the nut non-circular. The nut is supported by a nut support with one or more surfaces to be engaged by and which may be complementary to corresponding ones of the plurality of projections on the nut. The nut support surfaces engaging a projection on the nut limits or prevents rotation or pivoting of the nut relative to the support. In one configuration, the nut is allowed to float axially of a threaded bore of the nut a selected distance suitable for the application. The complementary surfaces on the nut support engage corresponding surfaces on respective projections on the nut to limit pivoting of the nut about its axis. As a result, the complementary surfaces on the nut support bear any loading that may occur during torque of the nut. The nut may be captured by a cage formed as part of the nut support, for example so that the complementary surfaces limit or prevent pivoting of the nut relative to the cage. The configuration of the cage may permit the desired float and provide the bearing surfaces that bear the loading from torquing from the nut.

In one example, a nut assembly includes a non-metal nut support and a plurality of engagement surfaces. A nut element has a base portion having a plurality of surfaces configured for engaging one or more of the engagement surfaces on the nut support. The engagement surfaces on the nut support and the nut element are configured so that upon pivoting of the nut element, such as under torque, the extensions engage at least four engagement positions on the respective ones of the engagement surfaces on the nut support. In one example, the engagement surfaces on the nut support extend upwardly from a surface supporting the nut element, and in another example, the engagement surfaces on the nut support are formed as perimeter walls of the nut support, and in another example, the engagement surfaces are walls, cavities or openings in an upper wall or surface above the nut. In a further example, the engagement surfaces on the nut support are walls forming cavities or openings into or through the nut support. In other examples, the engagement surfaces are combinations of two or more of the foregoing examples of engagement surfaces. For example, the four positions of engagement on the nut support may be a combination of upwardly extending bosses and perimeter wall portions. Other combinations can be used. The engagement surfaces on the nut support limit or prevent rotation of the nut relative to the nut support, for example during installation and before the nut is fully seated, or during removal after the nut is first loosened. The nut support also includes an opening for providing access by a fastener element to the nut element.

In one example of a nut assembly, the nut assembly may include a non-metal nut support and a nut element. The nut support may include a base surface complementary to one portion of the nut. For example, the base surface may have a relatively flat portion complementary to and oppositely-facing flat portion of the nut, against which the nut rests when pressed against the base, for example by gravity or the tightening of a fastener. The nut element further includes a plurality of surfaces (for example which together define a non-planar surface), for example about a perimeter of the base of the nut, on the base surface of the nut or locations on the nut for engaging complementary surfaces on the nut support. The plurality of surfaces engage bearing or opposing surfaces on the nut support to limit or prevent rotation of the nut relative to the nut support by torque applied to the nut. The plurality of surfaces on the nut in one example can be serrations or knurling or diamond points, for example, on an oppositely-facing portion of the nut, one or more radially-extending points on a perimeter of the nut, downwardly-extending claws or points on the nut, upwardly-extending horns or points on the nut, or combinations of these surfaces. Serrations or knurling or diamond points, for example, provide a relatively large number of contact points, lines or planes to accommodate the loading while the nut is under torque. Corresponding surfaces on the nut support, for example on the base surface, may include a smooth surface for supporting serrations or knurling, upwardly-extending bosses, points or walls for engaging points on a perimeter of the nut (whether radially outward, downwardly-extending or upwardly-extending points on the nut), cavities or holes in the base surface of the nut support for engaging downwardly-extending points on the nut or combinations of the surfaces. The nut assembly may also include one or more surfaces for limiting axial movement of the nut away from the base surface of the nut support. The axial-limiting surfaces may include a wall opposite the base surface, one or more arms sandwiching the nut between them and the base surface or other surfaces that might help in creating a cage for the nut element. The nut support also includes an opening for providing access by a fastener element to the nut element.

In the foregoing examples of a nut assembly, any of the nut assemblies can be incorporated into and made part of a clip nut or a nut plate. In examples of clip nuts, the clip nut can include a clip with a nut assembly incorporated onto one part of the clip. Several examples of a clip nut include those shown and described in U.S. Pat. No. 6,854,941, the text and drawings of which are incorporated herein by reference for all purposes. Conversely, any of the clip nut configurations described herein can be reconfigured as nut assemblies, for example for use as nut plates. Additionally, conventional nut plates can be reconfigured to incorporate any of the nut assembly configurations described herein.

In one example of a nut assembly, for example for use with a clip nut, nut plate or other assembly, a non-metal nut support includes a plurality of engagement surfaces. A nut element includes a threaded, axially extending portion and a base portion, and the base portion has a plurality of extensions configured for engaging one or more of the engagement surfaces on the nut support. The engagement surfaces on the nut support and the nut element are configured so that upon pivoting of the nut element, the extensions engage at least for points on respective ones of the nut support engagement surfaces. In one example, the plurality of extensions on the nut are four or more tabs or spokes or other outwardly extending projections for engaging complementary engagement surfaces on the nut support. The nut support engagement surfaces may be upwardly-extending bosses, perimeter edge walls or other bearing surfaces. In another example, the plurality of extensions are downwardly extending tabs or projections, for example four or more in number, and the nut support engagement surfaces are cavities in or openings through portions of the nut support. In the example of a clip nut assembly, openings are provided through the clip for allowing access by a fastener element to the threaded portion of the nut. In the example of a nut plate, an opening is provided through the plate for allowing access by a fastener element to the threaded portion of the nut.

In an example of a clip nut, a non-metal clip includes a non-metal nut cage for supporting a nut element. The nut cage is positioned on the clip near an access opening for the clip. The nut cage includes a base surface for supporting one surface of a nut element and a spaced apart mating wall opposite the base surface for supporting a second surface of the nut element. In one example, the base surface and the mating wall are configured to allow a selected amount of float for the nut element. The mating wall has a part that can flex ("flex" as used herein to mean "bend") toward and away from the base surface. In one example, flexing of the part of the mating wall allows easier placement of the nut element in the cage. One example of a mating wall has the mating wall cantilevered over the nut element. For example, the mating wall can be supported by the clip along one width-wise extending transition wall, with the remaining surfaces around the remaining perimeter of the mating wall out of contact with or spaced apart from the clip. In another example, a smaller portion of the mating wall can be cantilevered over the nut element while having the remaining portions of the mating wall supported by the clip. The cantilevered portion would flex toward and away from the clip, for example to make easier the assembly of the nut with the cage. In a further example, the nut cage can include an opening in the mating wall for receiving and retaining a barrel of the nut element, such as the slot 26 shown in U.S. Pat. No. 6,854,941. In another example, the nut cage can have the mating wall cantilevered over the nut element from a transition wall between the clip and the mating wall with a plurality of openings in the transition wall for receiving corresponding tabs or points extending outward from the nut element. The openings in the transition wall form bearing surfaces for receiving the loading applied through the tabs or points on the nut element when the nut element is under torque. In a further example, the nut cage can have bosses or other upwardly-extending bearing walls raised from the surface of the base surface, such as a base surface formed by a portion of the clip. Such upwardly-extending bearing walls form bearing surfaces for receiving loading applied through tabs or points on the nut element when the nut element is under torque. In an example where the nut element has the configuration shown in U.S. Pat. No. 6,854,941, such upwardly-extending bearing walls complement openings in a transition wall on an opposite side of the nut cage for limiting pivoting of the nut element when under torque. The nut element can also have downwardly-extending tabs or points for engaging cavities in or openings through the base surface of the nut cage. In any one or more of these examples, the clip and the nut cage can be monolithic.

In another example of a clip nut, the clip nut includes a non-metal clip having first and second arms converging toward an opening in the clip for receiving a panel or other supporting element. The first and second arms can flex relative to each other and include respective openings for receiving a fastener element into a nut element. A non-metal ledge or shelf has a first portion joined to an end of the second arm in such a way that the ledge or shelf is spaced apart from the second arm and has a second portion with at least one side cantilevered over a side of the second arm. The cantilevered side portion allows that portion of the ledge or shelf to flex relative to the second arm to make it easier to receive a nut element between the ledge or shelf and the second arm. In combination, the ledge or shelf and the second arm form part of a nut cage for receiving the nut element. In one example, the non-metal clip and the ledge or shelf are monolithic. In one example, the joinder between the second arm and the ledge or shelf includes a thicker portion or reinforcement for providing a reinforced bearing surface for one or more portions of a nut element. In another example, the ledge or shelf extends away from the joinder with a second arm in a direction that converges toward the second arm. The ledge or shelf may also include a partially circular opening for receiving a barrel on a nut element wherein the opening extends more than 180 degrees but with end points sufficiently spaced apart to allow the barrel to press past the end points and into the opening but not returning out without a similar guiding force. The opening for receiving the barrel of the nut element can also be non-circular, for example to conform to a non-circular profile for the nut element barrel. Where the ledge or shelf and the second arm combine to form part of a nut cage, the nut cage can include bearing surfaces against which portions of a nut element can bear when the nut element is under torque. The bearing surfaces may be bosses or upwardly-extending surfaces, including openings through wall elements or a transition between the second arm and the ledge or shelf, cavities in or openings through the second arm or a transition between the second arm and the ledge or shelf, or combinations of the foregoing. Bearing surfaces on or in portions of the nut cage interior to side edges of the second arm, a transition or a ledge or shelf may provide a stronger bearing surface than bearing surfaces located on side edges or perimeter portions of the second arm, transition or ledge or shelf. In several examples, the bearing surfaces of the nut cage are complementary to corresponding surfaces on a nut element. The bearing surfaces may be symmetric about a longitudinal plane of the clip, symmetric about a transverse plane, symmetric about an axis corresponding to the nut element, for example normal to the clip, symmetric or asymmetric about a perimeter of the nut element, or generally corresponding to the distribution of bearing surfaces on the nut element.

In a further example of a clip nut, a three-sided non-metal resiliently flexible clip has first, second and third clip portions wherein the second portion joins the first and third portions together to form the clip. A fourth non-metal portion joins the third portion at a line opposite the second portion and extends width-wise of the clip and extends in a direction toward the second portion so as to be over and spaced apart from part of the third portion. The fourth portion has a part that can flex toward and away from the third portion. The first, second, third and fourth portions may be monolithic, and the third and fourth portions may together form part of a nut cage. In one example, the nut cage can include bearing surfaces against which complementary portions on a nut element can bear when the nut element is under torque. The bearing surfaces may extend upwardly from the third portion, may be formed in the joinder between the third and fourth portions, may be formed in cavities in or openings through the third portion, or other complementary surfaces in the nut cage. The bearing surfaces can be formed in walls at perimeter side edges of the third element, or interior to perimeter side edges of the third element.

Another example of a clip may include a non-metal clip having opposed first and second arms joined at respective first ends of the arms. The arms may include openings for receiving a fastener for engaging a nut element. The third portion spaced apart from the second arm on a side of the second arm opposite the first arm joins the second arm through a transition wall. The third portion includes width-wise side edge surfaces and at least a first edge surface extends over the corresponding portion of the second arm and is sufficiently disconnected from the second arm to allow the first edge surface to flex toward and away from the second arm. The third portion and the second arm may form part of a nut cage and flexing of the first edge surface may make easier the installation of a nut element in the clip. The clip may include one or more bearing surfaces against which a corresponding element or elements on the nut element may bear when the nut element is under torque. The bearing surfaces may be the same as or similar to any of the bearing surfaces described herein against which a portion of a nut element bears.

In another example described herein, a method for forming a clip for a clip nut assembly includes forming a monolithic clip and nut cage combination, for example from a non-metal material. The combination is formed so as to have a cantilever wall portion that can flex toward and away from the rest of the clip. The cantilever wall portion allows easier installation of the nut element into the cage portion of the combination. The combination can be formed through molding, for example. In one example, the combination is formed so that the cantilever wall portion has a width-wise common transition wall with the rest of the clip with the rest of the cantilever wall portion disconnected from the clip. Forming the clip in this way allows a significant flexing of the cantilever wall portion for inserting the nut element. In one example, the cantilever wall portion is molded to include an opening configured to conform to the outer profile of a nut element barrel, and may include a press-fit gap similar to that described in U.S. Pat. No. 6,854,941. In another example, the combination can be molded or otherwise formed to include one or more bearing surfaces against which complementary portions of the nut element can bear while the nut element is under torque.

In an example of a method of assembling a nut assembly, for example a clip nut assembly, a structure having a nut cage is formed with a cantilever or flexing portion that can move away from the rest of the structure. A nut element is brought into contact with the structure and against the cantilever or flexing portion so as to move the cantilever or flexing portion away from the rest of the structure. As the nut element is received into the nut cage, the cantilever or flexing portion returns or resiliently moves in the other direction at least partly to its free-state configuration. The cantilever or flexing portion can either bear against the nut element, or it can be configured to return to its free-state configuration while still allowing the nut element to float a selected amount, for example axially of a threaded bore of the nut element. The structure can also include one or more bearing surfaces adjacent to which corresponding parts of the nut element are positioned so that the parts of the nut element bear against the bearing surfaces when the nut element is under torque.

In an example of a method of securing a panel, for example with a non-metal clip nut assembly, a clip nut is placed over a panel so that openings in the clip nut align with an opening in the panel. To secure the panel, a fastener element is inserted into the openings and against a nut element supported in a nut cage having an at least partly flexible wall portion. As the fastener element bears against the nut element, the flexible wall portion may flex while applying a counter force against the advancing fastener element until a fastener element begins to thread into the nut element. As the fastener element continues threading into the nut element, the flexible wall portion returns toward the rest of the clip nut assembly. Additionally, the nut element is tightened against the rest of the clip nut assembly.

These and other examples are set forth more fully below in conjunction with drawings, a brief description of which follows.

BRIEF DESCRIPTION OF THE DRAWINGS

FIG. 24 is a top plan view of the clip of FIG. 21.

FIG. 25 is a side elevation view of the clip nut assembly of FIG. 21.

FIG. 26 is a side elevation view of the clip of FIG. 21.

FIG. 27 is a longitudinal vertical section of the clip nut assembly of FIG. 21 taken along line 27-27 of FIG. 24.

FIG. 28 is a longitudinal vertical section of the clip of FIG. 26 taken along the same line as that of FIG. 27.

FIG. 29 is an upper isometric view of a nut element for use in the clip of the examples of FIGS. 21-28.

FIG. 30 is a top plan view of the nut element of FIG. 29.

FIG. 31 is a side elevation view of the nut element of FIG. 29.

DETAILED DESCRIPTION

Figure 1:
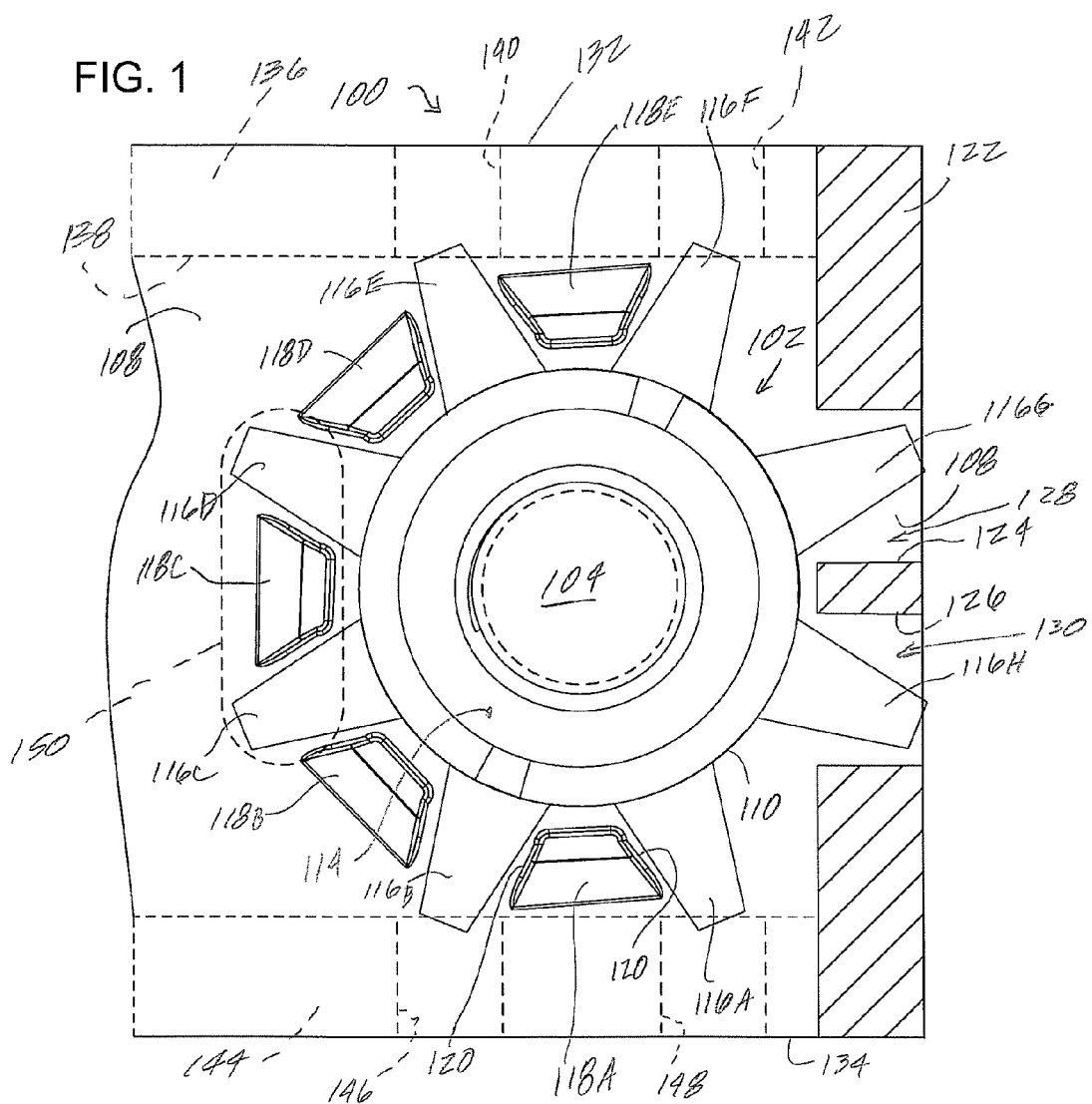
FIG. 1 is a partial schematic and top plan and partial section view of one example of a nut assembly and fastener element described herein.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of fastener assemblies and of methods of making and using the fastener assemblies are described. Depending on what feature or features are incorporated in a given structure or a given method, benefits can be achieved in the structure or the method. For example, fastener assemblies with a nut element held in a nut cage having a flexible element may be easier to use and maintain. Fastener assemblies with nut elements having a larger number of bearing surfaces may withstand greater torque forces and may have greater useful lifespan. Additionally, some fastener assembly configurations may also benefit from lighter-weight components, lower-cost and reduced wear.

In some configurations of fastener assemblies, improvements can be achieved also in assembly, such as with symmetric nut elements, where insertion of the nut element into a nut cage is easier. Additionally, nut cage configurations can improve the integrity of the final assembly, and may reduce the possibility of part failure.

Improvements are also provided to components with which the fastener assemblies may be used. For example, panels using the fastener assembly may be simplified or may be assembled more efficiently. Additionally, the fastener assembly may be configured to permit the bolt or other mating fastener element to be secured more easily.

These and other benefits will become more apparent with consideration of the description of the examples herein. However, it should be understood that not all of the benefits or features discussed with respect to a particular example must be incorporated into a fastener assembly, component or method in order to achieve one or more benefits contemplated by these examples. Additionally, it should be understood that features of the examples can be incorporated into a fastener assembly, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a number of fastener assembly configurations and of methods of making and using the fastener assemblies are described herein, and some have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Clip nut assemblies are used as examples of a fastener assembly that can incorporate one or more of the features and derive some of the benefits described herein, and in particular those used to secure panels. However, only a few examples of clip nut assemblies are described, it being understood, for example, that other nut cage configurations and other clip configurations could be used while incorporating one or more of the features described herein. Fastener assemblies other than clip nut assemblies can benefit from one or more of the present inventions.

It should be understood that terminology used for orientation, such as front, rear, side, left and right, upper and lower, and the like, are used herein merely for ease of understanding and reference, and are not used as exclusive terms for the structures being described and illustrated.

One example of a fastener assembly is partly represented in FIG. 1 by a nut assembly 100 having a nut 102 for receiving a fastener element 104 for securing a component. The component may be a panel or other structure where the fastener assembly is a clip nut, or a combination of a panel and mounting element for mounting items on to the panel, typical for clip nut applications. The component may be an element to be mounted to a frame structure, bulkhead or other structural support, such as may be routinely secured through a nut plate or similar fastener assembly. The fastener element 104 may be a bolt, screw or other threaded fastener element threaded into the nut 102, or the nut 102 and fastener element 104 may be otherwise configured to be secured together other than by threads.

FIG. 1 is schematic to the extent that it incorporates a number of features in a fastener assembly that may not necessarily always be used together. Additionally, FIG. 1 is a partial section to the extent that it omits a cantilever wall 106 shown in FIG. 1A. The nut 102 is supported from below by a non-metal nut support 108, which may be part of a clip, a plate for a nut plate assembly, or other support structure. In the example shown in FIGS. 1-1A, the nut support 108 has a substantially flat surface on or against which is supported the nut 102, either by gravity or by the fastener 104 pulling the nut against the nut support 108. While the nut support 108 is shown as having a substantially flat surface in the area supporting the nut 102, the support surface can have a configuration complementary to the adjacent surface of the nut 102. The nut support also includes a wall defining an opening (not shown) for allowing the fastener 104 to pass through the nut support.

The nut 102 includes a base portion 110 that rests on or bears against the support surface 108. In the configuration of the nut shown in FIGS. 1-1A, the base portion 110 has a bottom surface that is substantially flat with an opening in the bottom surface for a threaded channel through a substantially cylindrical barrel or cylinder 112 to an opposite end 114 for receiving the fastener element 104. The base portion 110 of the nut includes a plurality of surfaces configured for engaging one or more engagement surfaces in or on the nut support. In the example shown in FIGS. 1-1A, the base portion 110 includes a plurality of tips 116 extending substantially radially outward from the base of the nut. The tips may take the form of points, projections, extension surfaces, or other non-circular elements for engaging bearing surfaces in or on the nut support. The tips may be oriented on the base in a symmetric pattern, an asymmetric arrangement, with an odd or even number of tips, with the same or different lengths, with the same or different surface configurations, and with the same or different shape configurations. In the present example, the tips are arranged symmetric about frontal and longitudinal planes through the center of the nut. Each tip is in the shape of a converging point having flat top and bottom surfaces, and non-parallel converging side surfaces ending at a tangent flat surface at the outer periphery. The example shown in FIG. 1 has eight tips distributed uniformly about the perimeter of the base 110 separated from each other by a substantially arcuate wall in the base. The tips can also come in other numbered arrangement, extend from the base other than radially, and can have surfaces other than flat. Each tip makes the base of the nut non-circular so that the tip can bear against a bearing surface in the nut support when torque is applied to the nut.

In the example shown in FIG. 1, the nut support 108 includes a plurality of bearing surfaces against which one or more of the tips can bear when torque is applied to the nut. The bearing surfaces can have configurations complementary to the surfaces on the base of the nut, in this example complementary to the tips 116, or they can have their own configurations. A bearing surface preferably has a size and mass to withstand, when combined with any other bearing surfaces, expected loading from the tips 116 when torque is applied to the nut. In the example shown in FIG. 1, the nut support 108 includes a plurality of bosses 118 extending upward from the support surface 108 a distance sufficient to allow reliable contact by the tips 116. Each boss 118 includes a relatively flat side surface 120 opposite or adjacent a respective flat side of a tip 116. With the arrangement of the tips about the perimeter of the base 110, each boss 118 is shown as having a trapezoidal outline. Each boss can have substantially straight sides extending vertically from the support surface, or each boss can have a ramp configuration in the upper surface of the boss. Other configurations can be used also.

In the example shown in FIG. 1, the side surfaces of the tips are substantially flat and adjacent substantially flat bearing surfaces of the bosses 118. When the nut 102 pivots in either direction, a side surface of each tip 116 contacts and bears against the corresponding surface of the adjacent boss 118. Because both the side surfaces of the tips and the side surfaces of the bosses are substantially flat, they are complementary to each other and the loading applied through a given tip to the adjacent boss is spread over more of the surface area of the boss. The larger the surface area of contact, the more the loading is spread across the surface. Additionally, for any given torque, the more surfaces that are contacted by tips 116 while torque is applied the greater is the distribution of the loading, and the likelihood of damage or failure of the part is reduced. Additionally, the dimensions of the base 110, the tips 116, the bosses 118, their positioning and relative spacing can be selected so that pivoting of the nut results in contact between as many engagement portions and bearing surfaces as practicable. Any engagement position may occur (as a result of contact between a portion of the nut and a portion of a bearing surface) at a point, along a line or edge, or across a surface. The particular form of the engagement position for a combination of 10 nut surface and bearing surface will be determined by the configurations of the respective surfaces and their relative orientation at contact. In these examples, tips or other portions on the nut and bearing surfaces in or on the nut support are preferably configured to function as described whether the nut pivots clockwise or counterclockwise.

With the nut and tips 116 configured and positioned to be supported by the nut support 108 and bear against the bosses 118, when torque is applied, the combination may be sufficient to withstand the loading. The bosses 118 can be distributed between each pair of tips 116, or otherwise distributed as desired. The bosses can be distributed and positioned as desired to orient the nut in the desired orientation. As shown in FIG. 1, a pair of adjacent tips extends to one side of the support and a pair extends to the opposite side. Likewise, a pair of adjacent tips extends to the front and a pair extends to the back. Additionally, or instead, other bearing surfaces may be used to receive the loading, several of which are illustrated in FIG. 1. For example, one or more of the bosses 118 may be used in conjunction with a wall 122 along a front portion of the nut assembly. The wall 122 includes first and second interior walls 124 and 126, respectively, defining openings 128 and 130 through the wall 122. Respective tips 116 extend through the openings and will contact the interior walls 124 and 126 when the nut pivots. In the example shown in FIG. 1, the openings extend substantially parallel to a longitudinal axis of the nut assembly (from left to right in the view shown in FIG. 1), but the walls can also be configured to conform more closely to the profiles of the adjacent tips 116. In this configuration, tips 116 of the nut 102 bear against bearing surfaces formed with a combination of bosses 118 and walls or cavities formed in an exterior wall 122. Other combinations of bearing surfaces can be used, or as with the bosses first described, all of the bearing surfaces can be identical.

In the configuration shown in FIG. 1, pivoting of the nut moves most of the tips into contact with an adjacent surface formed as part of the nut support. For example, if the nut were to rotate clockwise as viewed in FIG. 1, and with the desired size and spacing of the components, each tip will come into contact with associated bearing surface substantially simultaneously with the others. In the example of FIG. 1, the tip 116A will contact the adjacent side surface of the boss 118A, and so on for each of the tips 116 that has an associated boss in the direction of rotation. The tip 116F is not shown close enough to an adjacent surface such as the wall 122 to make contact. Additionally, the tip 116G contacts the wall 124 and the tip 116H contacts the wall 126. In this configuration, the nut has seven points of contact with the nut support when torque is applied. Likewise with the counterclockwise direction. If corresponding bosses or other bearing surface walls were placed between tips 116F and 116G, and between 116H and 116A, the nut would have eight points of contact with the nut support when torque is applied. Similarly, when four bosses are used with the openings 128 and 130, there are six points of contact, when three bosses are used with the openings, there are five points of contact, and so on.

The bosses can have a number of configurations, and may be round, rectangular, square, or have other uniform shapes, including other polygon shapes and the like. The bosses can also have non-uniform shapes. As shown in FIG. 1, the bosses are interior to side edges, including a first side edge 132, a second side edge 134 and the exterior wall 122. Having the bosses interior to the side edges allows them to more fully distribute the loading applied to the boss. Distribution of loading applied to the walls 124 and 126 produces a different loading profile, which may not be as desirable as loading on an interior surface.

Other bearing surfaces may also be included or substituted in the nut assembly. In two examples shown in phantom in FIG. 1, a first wall 136 extends upward from the support surface 108, and to the extent that the first wall 136 terminates at a free surface short of the cantilever wall 106 the first wall 136 can be considered a boss or other projection extending upward from the surface of the nut support 108 and extending along the edge 132. The first wall 136 can have a substantially flat interior wall 138 spaced sufficiently from the adjacent tips 116E and 116F to allow the nut to pivot but close enough so that the tips contact the interior wall 138 when sufficient torque is applied to the nut. Alternatively, the first wall 136 can include cavities or through walls 140 and 142 into or through the surface of the wall 138. The size and spacing of the walls 140 and 142 are selected so that the tips 116E and/or 116F bear against the associated walls when the nut has pivoted the desired amount. Therefore, instead of or in addition to the bosses 118 and the wall portion 122, a wall 136 can serve as a bearing surface or bearing surfaces for the nut. Perimeter wall portions can serve as bearing surfaces for the nut. Likewise, a second wall 144 and/or through walls 146 and 148 can be used as bearing surfaces for the nut. In either or both cases of the walls 136 and 144, the walls may terminate at a free surface or may extend sufficiently to contact and/or engage the cantilever wall 106.

Instead of or in addition to any one of the bosses, wall 122 and openings 128 and 130, or first or second walls 136 and 134, the nut support 108 can include one or more cavities or openings 150 extending into or through the nut support 108. The opening 150 is shown in FIG. 1 as forming bearing surfaces for two tips 116C and 116D, but each tip can have a respective or separate cavity or opening. Alternatively, a cavity or opening can form bearing surfaces for more than two tips or other nut projections. A given cavity or opening can be considered to be opposite or obverse to a boss, and the discussion relating to the bosses also applies to cavities or openings for providing bearing surfaces for the nut. Instead of extending upwardly from the nut support surface 108 like the bosses, the cavities or openings extend downward into or through the surface of the nut support 108. Likewise if the nut support surface 108 includes a cut out or other depression for accepting the nut 102, then the bearing surfaces would be formed as cavities below the surface of the nut support 108. In another alternative, where the nut rests on the top of the nut support surface, and one or more cavities or openings 150 extending below the nut support surface are used as bearing surfaces, corresponding tips 116 can be configured to bend downward into the corresponding cavity or opening. When the nut pivots, tips bear against corresponding bearing surfaces in the openings 150, which take the loading while the nut is under torque.

Figure 1A:
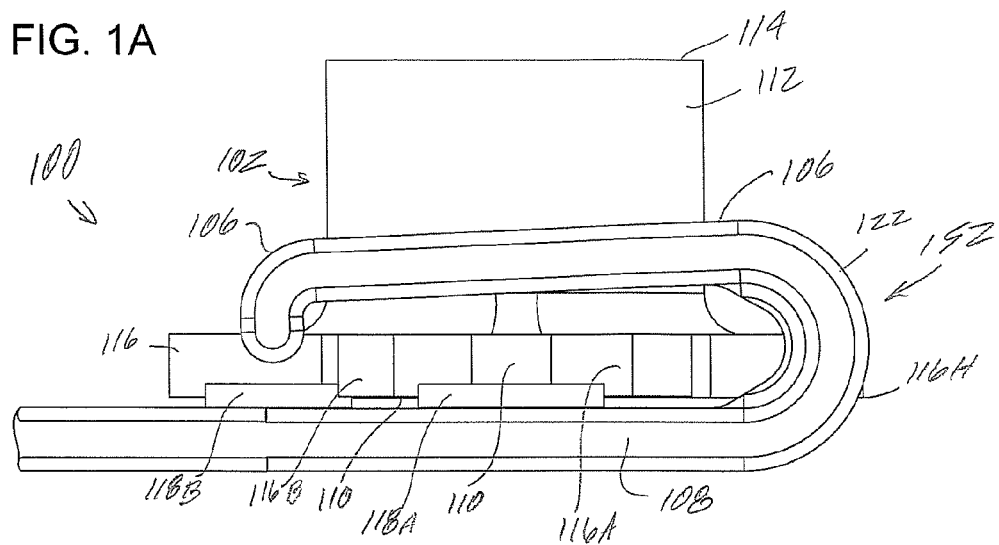
FIG. 1A is a side view of the nut assembly of FIG. 1 omitting a fastener element.

The nut 102 can take any desired configuration, and the nut support can be configured to provide the desired bearing surfaces as a function of the nut configuration. Alternatively, the nut support can be configured and the nut can be designed to apply loading best suited to the nut support design. In the examples of FIGS. 1-1A, the nut support is formed as a monolithic element and may be molded from a non-metal material. The nut support 108, the wall 122 and the cantilever wall 106 form a nut cage 152 (FIG. 1A) for retaining the nut in the cage once inserted. The nut support, wall and cantilever wall may be configured to allow the nut to float axially and to pivot a certain amount. The nut cage can include any one or more of the bearing surfaces described herein and may have the nut support, transition wall portion 122 and cantilever portion 106 in any of the configurations described herein. For example, the cantilever portion 106 can be a ledge or shelf extending from the transition wall 122 and extending parallel to or converging toward the nut support 108 while still allowing flexing of the cantilever wall 106 toward and away from the nut support 108. Flexing can occur, for example, in the nut cage 152 at or near the wall portion 122. In the example shown in FIG. 1A, flexing may occur at the end of the wall portion 122, for example in the area of the start of the wall 106 that is supported by the wall portion 122. Other flexing configurations can be included in a nut cage. The nut cage can be formed as part of a clip nut assembly, nut plate or other component incorporating a nut cage.

A nut assembly can be used with a number of components, including clip nuts such as those examples described in FIGS. 2-31. In one example of a fastener assembly 200 in the form of a clip nut assembly 202 (FIGS. 2-15), a non-metal nut support, or clip, 204 supports a nut element 206 (FIG. 15) with a nut cage 208. In the present example, the nut cage is formed as part of the clip 204, and specifically it is formed to be integral with the rest of the clip 204. However, nut support configurations other than a nut cage may be used. The clip nut assembly 202 is mounted to and supported by an element such as a panel 210 having an opening 212 formed in it for receiving and engaging a substantially annular boss 214 on a first arm 216 of the clip 204. Another component such as another panel 210A may be mounted through a fastener element such as a threaded bolt 218 (which can be shown in phantom, for example where product is distributed without a bolt). The bolt can have a cylindrical head, a beveled head for counter-sink, or other configurations. Other components besides a panel 210A may be supported by the combination of the panel 210 and clip nut assembly 202, as would be known to those skilled in the art.

Figure 2:
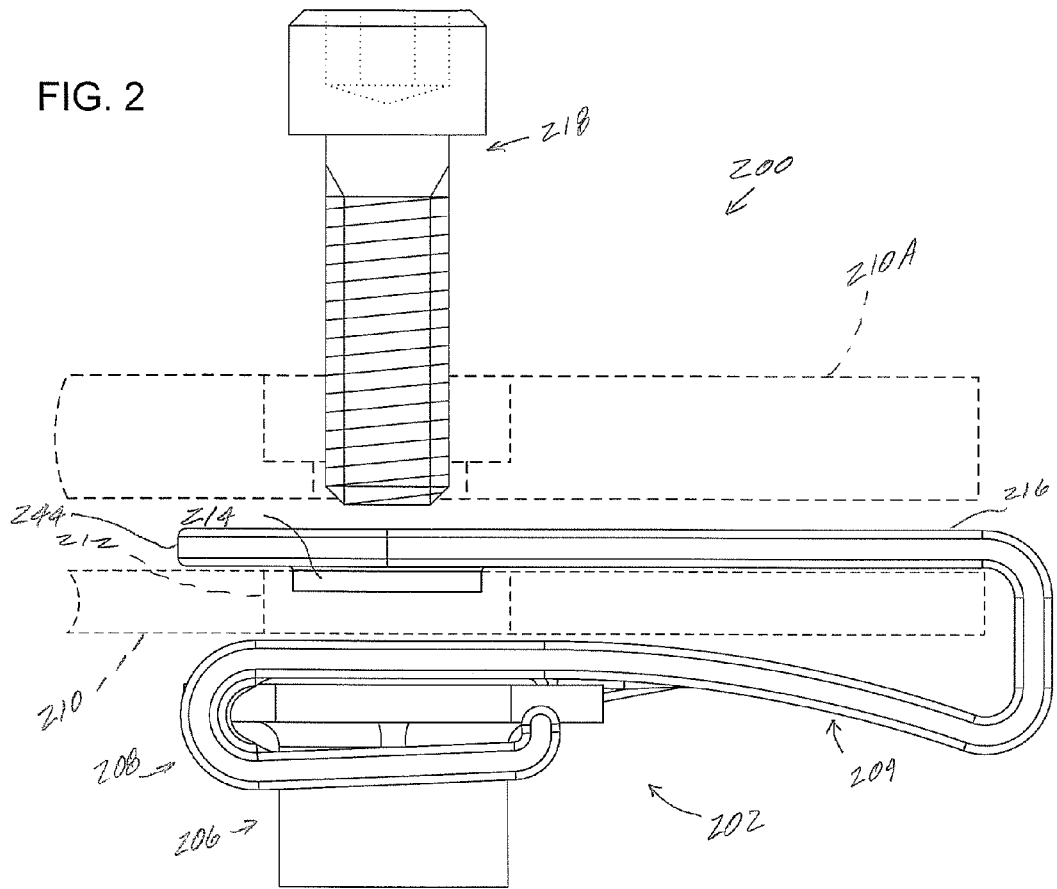
FIG. 2 is a side elevation view of a fastener assembly using a clip nut assembly incorporating a nut assembly in accordance with one of the examples described herein.

The panel 210 can include a number of clip nut assemblies 202 for mounting components to the panel 210. Therefore, one construction as represented by FIG. 2 includes a panel 210 or other support structure with a plurality of clip nut assemblies 202 to which other components 210A can be mounted through respective fastener elements 218. The orientations of the components and the fastener assembly are varied and depend on the structure supporting the panel 210. The orientation shown in FIG. 2 is common for discussion because the clip nut assembly receives the fastener for securing or mounting the component 210A. However, because most of the discussion herein is directed to the clip nut assembly, the orientation of the clip nut assembly will generally be different and usually illustrated reversed. Nonetheless, it should be understood that the clip nut assembly can be used in a number of configurations.

Considering the clip nut assembly in more detail, the clip retains the nut element 206 in the nut cage 208. As shown in FIGS. 4, 6, 8 and 15, the nut element includes a base 220 supporting a generally cylindrical internally threaded portion in the barrel 222. The barrel extends from the base 220 to an end surface 224 defining an opening for the barrel. The barrel may be substantially cylindrical in its inside and outside profile, or the barrel can be crimped to increase the frictional engagement with the fastener 218. In an alternative configuration, the nut can also be a beam locking nut, or other nut configurations.

In the present example, the base 220 of the nut has a substantially smooth, flat bottom surface and a substantially smooth, flat upper surface. The upper surface curves from the flat surface upward to the outer perimeter surface of the barrel 222. The nut element 206 includes tips 226 extending outward from the base 220. The tips 226 can take the form of projections, pads, arms, extensions, points or other surfaces which keep the base from having a circular perimeter. The tips 226 are arranged in pairs on each side of a transverse plane and each pair extends along a longitudinal plane. The tips 228 and 230 in the first pair extend in a direction opposite to the tips 232 and 234 in the other pair. The tip 228, and each tip in the example of the nut 206, includes a substantially straight wall 236 forming an inside surface of the tip 228, and an angled surface 238 forming an outside surface of the tip 228. The straight and angled surfaces end at a transverse flat end wall 240. Depending on the configuration of the nut support, pivoting of the nut 206 may cause the straight surface 236 to contact a bearing surface, the angled surface 238 to contact a corresponding bearing surface, or the respective junctions between those walls and the end wall 240 to contact a bearing surface. Additionally, some configurations may have the flat end wall 240 contacting a bearing surface.

The nut 206 in the present example is a conventional nut such as that shown and described in U.S. Pat No. 6,854,941. The nut is formed from metal and is symmetric about both the transverse and longitudinal planes. Consequently, the nut can be inserted into the clip in two orientations, one 180 degrees apart from the other.

The clip 204 (FIGS. 2-3) includes the first arm 216 having a flat and smooth upper surface 242 extending between a substantially semi circular free end 244 and a support end 246. An interior wall 248 extends from the upper surface through the inside of the annular boss 214 for receiving the shank of the fastener 218. The boss 214 extends inwardly from an otherwise substantially flat and smooth surface on the inside of the first arm 216, and aside from the boss 214, the first arm has a substantially constant thickness. The opposite edges of the first arm and the semi circular free end 244 have substantially flat side walls with filets forming rounded edges between the side walls and the upper and inside surfaces of the first arm. The first arm 216 for the clips in all of the examples herein are substantially identical, and the first arm in the example of FIGS. 21-28 can also have filets or rounded corners between the side walls and the upper and inside surfaces of the first arm. A 90-degree curved transition 250 has a substantially constant curvature extending from the support end 246 of the first arm and joins the first arm 216 to a second arm 252. The second arm 252 is substantially straight and has substantially flat outside and inside surfaces producing a substantially constant thickness for the second arm 252. The second arm extends widthwise of clip substantially the same width as the first arm 216. The second arm 252 also has filets or rounded edges between substantially flat side walls and the outside and inside surfaces. Additionally, the thicknesses of the first arm and the second arm and the transition wall 250 10 are substantially identical. The second arms of all of the clips described herein are substantially identical to each other and the second wall and transition wall of the clip shown in FIGS. 21-28 can also include filets or rounded edges.

A greater than 90-degree transition wall 254 joins the second arm 252 to a third or lower arm 256. The transition wall 254 has a substantially constant curvature, and like the transition 250, has a substantially constant thickness. Also like transition 250, the transition wall 254 can include filets or rounded edges, and is identical to the transition walls for the other examples of clips herein and the transition wall for the example of the clip shown in FIGS. 21-28 can also include filets or rounded edges.

Figure 6:
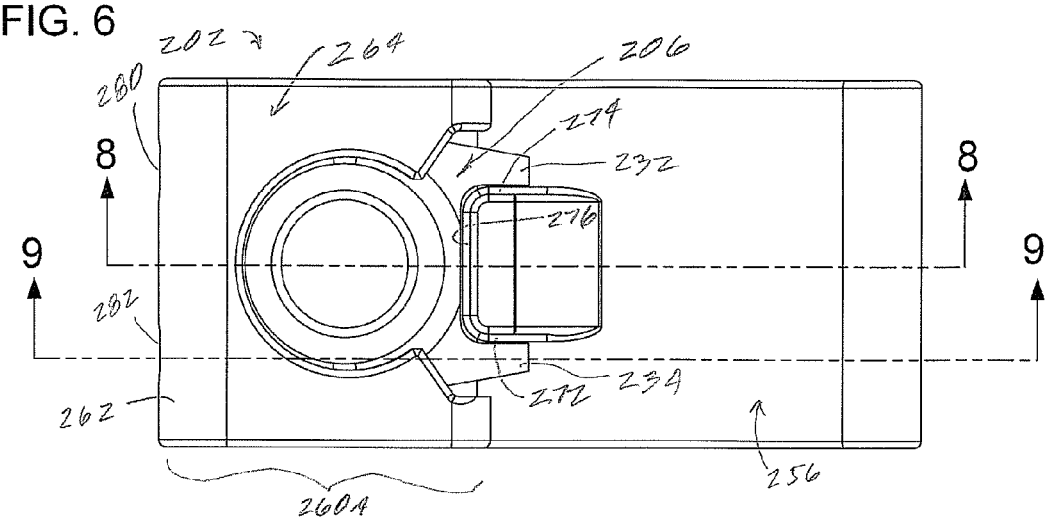
FIG. 6 is a top plan view of the clip nut assembly shown in FIG. 2.
Figure 7:
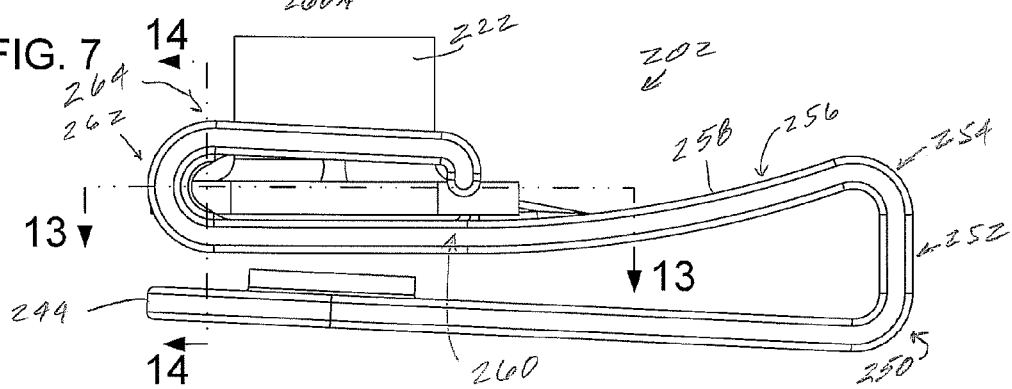
FIG. 7 is a side elevation view of the clip nut assembly of FIG. 2.
Figure 8:
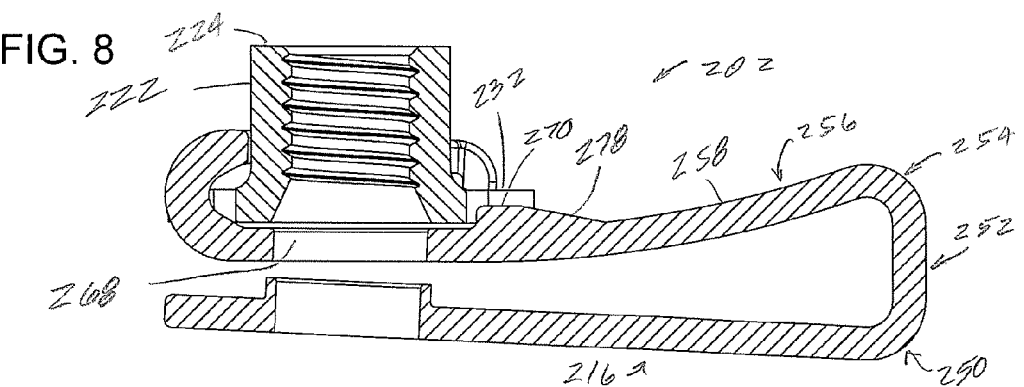
FIG. 8 is a longitudinal vertical section of the clip nut assembly of FIG. 2 taken along line 8-8 of FIG. 6.
Figure 9:
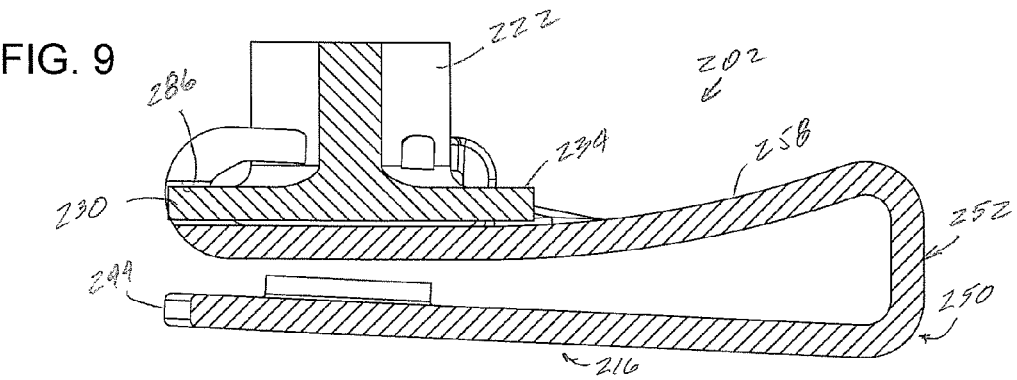
FIG. 9 is another longitudinal vertical section of the clip nut assembly of FIG. 2 taken along line 9-9 of FIG. 6.
Figure 10:
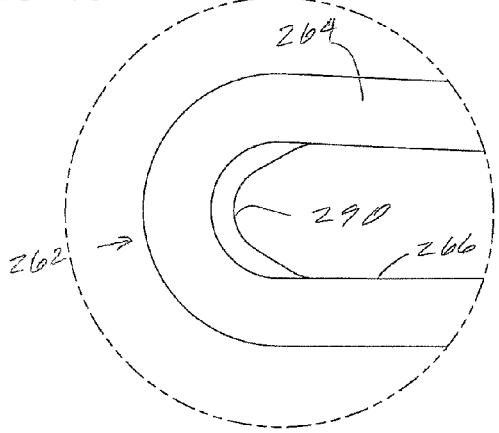
FIG. 10 is a side elevation view of a detail of a transition in the clip of FIG. 5.

The third or lower arm 256 includes a slightly concave curving portion 258 extending from the transition 254 to the nut cage 208. The concave portion 258 supports the nut cage and the nut element 206 during installation and assembly of the fastener assembly and components. The third arm 256 extends along the concave portion 258 to a substantially flat nut support portion 260 (FIG. 7), which extends a distance approximately indicated by 260A (FIG. 6). The opposite surface of the concave portion (the convex surface) and the adjacent surface on the adjacent surface of the nut support portion are both substantially smooth. Therefore, those clip surfaces other than the boss 214 contacting the panel planar surfaces are substantially smooth.

The nut support portion 260 terminates at a substantially constant curvature transition wall 262 curving around slightly more than 180 degrees to a cantilever wall 264, forming part of the nut cage 208. The cantilever wall 264 forms a portion spaced apart from the nut support portion 260 on a side of the nut support portion opposite the first arm 216. As discussed more fully below, the cantilever wall can move toward and away from the nut support portion. The cantilever wall 264 is substantially straight and flat, except for two tabs. The cantilever wall 264 extends toward the second wall 252 and converges slightly toward the third wall 256 by approximately 3° relative to the nut support 260. The cantilever wall 264 and the first arm are substantially parallel in the present example. The third arm, the transition wall 262 and the cantilever arm 264 extend widthwise the same width as the second and the first arms, and the peripheral edge walls include flat surfaces joining the widthwise extending surfaces through filets or radius edges. The thickness of the third arm 256 and the cantilever wall 264 and a portion of the transition wall 262 are substantially all the same thickness, and substantially the same thickness as the second and first walls, except for the boss and the transition portions described below.

Figure 5:
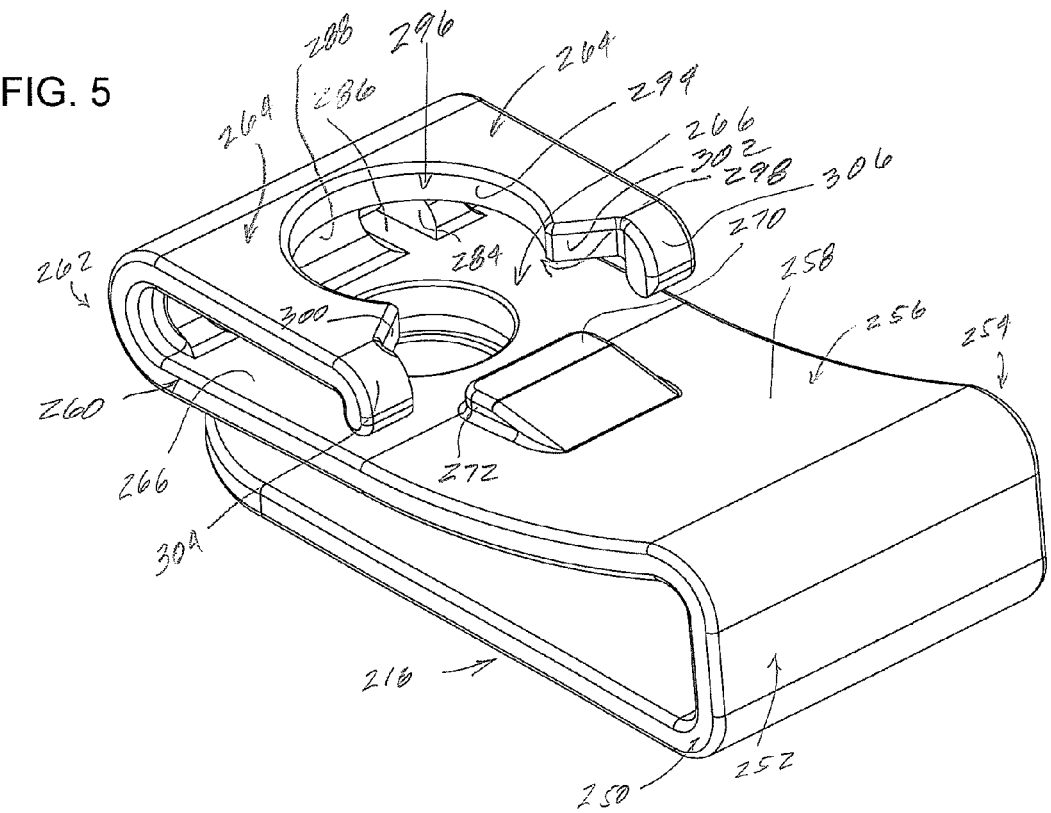
FIG. 5 is an upper rear isometric view of a clip nut used in the clip nut assembly of FIG. 2.

The nut support portion 260 includes a substantially flat nut support surface 266 (FIG. 5). The nut support surface extends sufficiently widthwise to support the base of the nut 206, both when the nut is allowed to float and when the nut is secured against the support surface 266 by the fastener 218. The nut support surface 266 extends approximately the distance 260A for supporting the nut, and may include a portion extending into the transition wall 262, described more fully below. A wall 268 (FIG. 8) is formed in the nut support portion for allowing the shank of the fastener 218 to access the nut 206.

A boss 270 extends upward from the nut support surface 266. The boss 270 forms one or more bearing surfaces against which the nut 206 can bear while the nut is under torque. The boss includes a first side surface 272 (FIG. 5), a second side surface 274 (FIG. 6) and a transverse surface 276, any one or more of which surfaces the nut can bear against. The first, second and transverse surfaces are configured so as to substantially complement the cavity defined between the pair of tabs 226 of the nut 206. Either cavity of the nut can be positioned around the boss 270. While the boss can take other configurations, conforming to the adjacent surfaces of the nut provides significant bearing support. Most of the boss 270 extends upwardly away from the nut support surface a distance approximately half the height of the tabs 226. The boss can extend higher or lower, for example higher to the top or above the base or lower below a half-way point of the base, but the existing height provides suitable support to the nut under torque in the present configuration of the clip nut. Flexibility in the cantilever wall 264 permits easier insertion of the nut over the bosses.

The boss 270 is substantially centered widthwise of the clip and is substantially symmetrical about the longitudinal plane of the clip. In this configuration, there is a substantial mass of third arm material surrounding the boss 270, which can provide material support to the boss when the nut is under torque. The boss is a significant distance from each of the side edges of the clip. Additionally, the boss is a significant distance from the opening 268 and from the transition wall 254.

Part of the boss 270 decreases in height as it progresses rearward toward the concave portion 258 and to a ramp surface 278. The ramp surface 278 slopes downward to the concave surface 258. The ramp surface 278 and the sloping portion of the boss allow the nut element 206 to more easily slide over the boss 270 and into the nut cage 208 during assembly of the clip nut.

When the nut element 206 is under torque, for example in the clockwise direction as viewed in FIG. 6, the tab 232 contacts the second side surface 274 of the boss, and the tab 234 moves slightly away from the boss. Additionally, depending on the spacing, part of the base of the nut element 206 may contact the transverse wall 276, which may provide additional support against the loading. In this configuration of the nut and the boss 270, the boss 270 provides at least one point of contact for the nut element.

In the example shown in FIGS. 2-15, the nut support surface 266 is substantially flat from the boss 270 forward to the beginning of the transition wall 262, and the nut support surface 266 has no bearing surfaces for the base of the nut 206 between the boss 270 and the transition wall 262. Additionally, no wall portions or other peripheral edge structures extend upwardly from the third arm 256.

Figure 3:
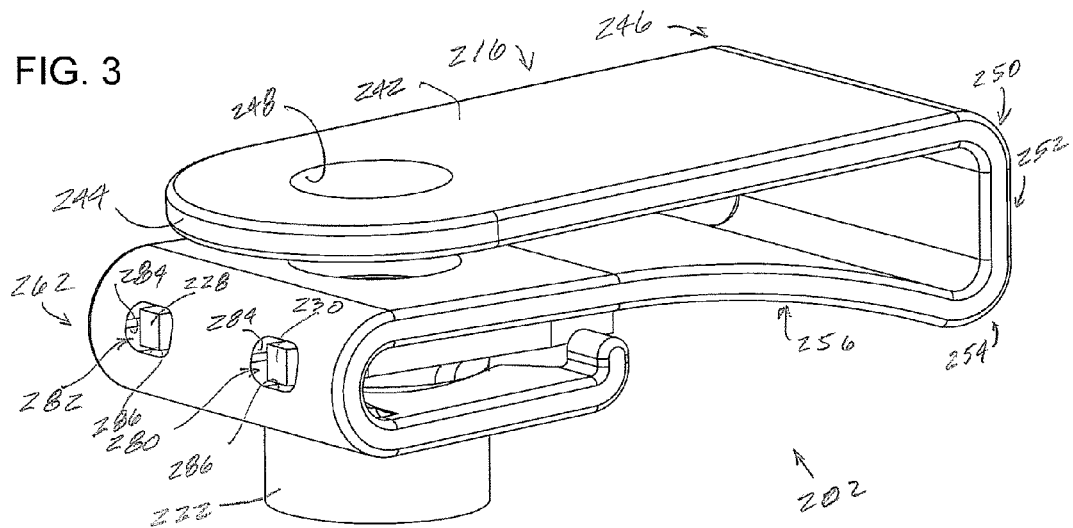
FIG. 3 is a lower isometric view of the clip nut assembly shown in FIG. 2.
Figure 4:
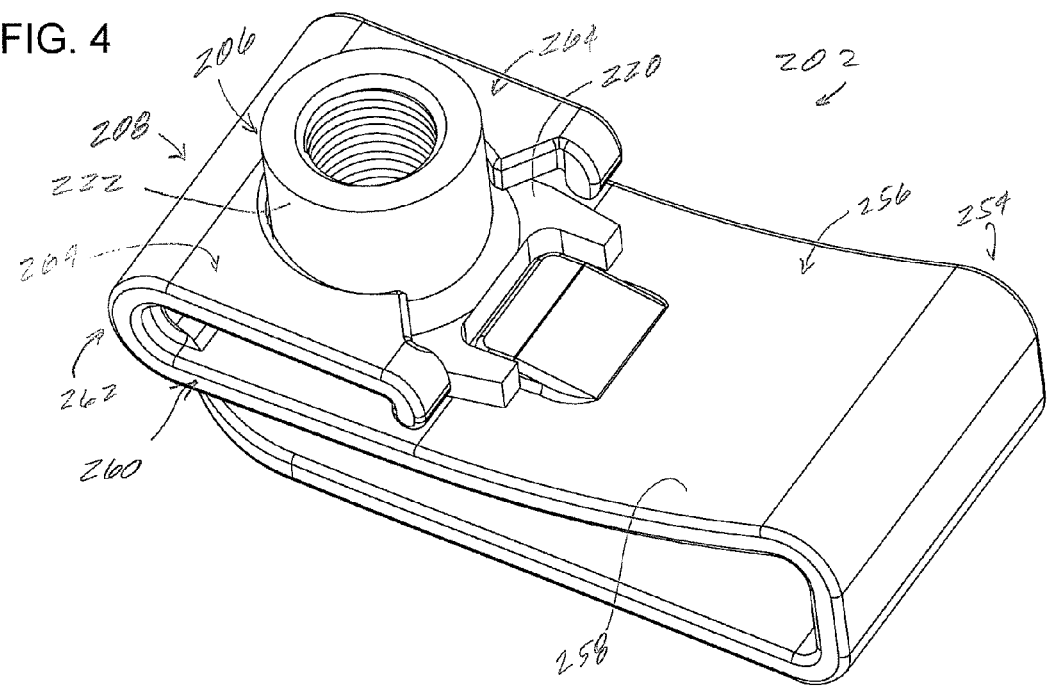
FIG. 4 is an upper rear isometric view of the clip nut assembly of FIG. 2.

The transition wall 262 includes at least one, and in the present example two, wall openings 280 and 282 (FIG. 3) extending from the inside of the transition wall 262 to the outside. The openings are defined by respective substantially oval walls extending substantially parallel to the longitudinal axis of the clip. Each opening includes oppositely facing curved side walls 284 and oppositely facing straight upper and lower walls 286 defining the oval openings (FIGS. 3 and 5). The walls of the openings form bearing surfaces for supporting the tabs 228 and 230 extending from the perimeter of the base of the nut element. If the nut 206 pivots clockwise as viewed in FIG. 6, the tips 228 and 230 will contact the side walls 284 of the respective oval openings and bear against those walls while the nut is under torque. In the configuration of the present example, the bearing surfaces in the nut cage 208 provide three points of contact for supporting the nut while it is under torque. Similarly, three-point contact would support the nut 206 if it pivots in the counterclockwise direction as viewed in FIG. 6.

In the example of FIGS. 2-15, bearing surfaces are provided for the nut through a combination of a boss and cavities or opening walls extending through a wall extending upwardly from the nut support surface 266. Additional bosses can be used, additional openings, additional support walls, cavities or other openings in the nut support 260 or other bearing surfaces can be provided to give additional points of contact or alternate bearing surface configurations. For example, bosses can be provided on opposite sides of the tabs 232 and 234 from the boss 270 for providing an additional point contact when the nut pivots in either direction. Additionally, the nut can include additional tabs or other elements for bearing against a bearing surface when the nut is under torque.

Figure 13:
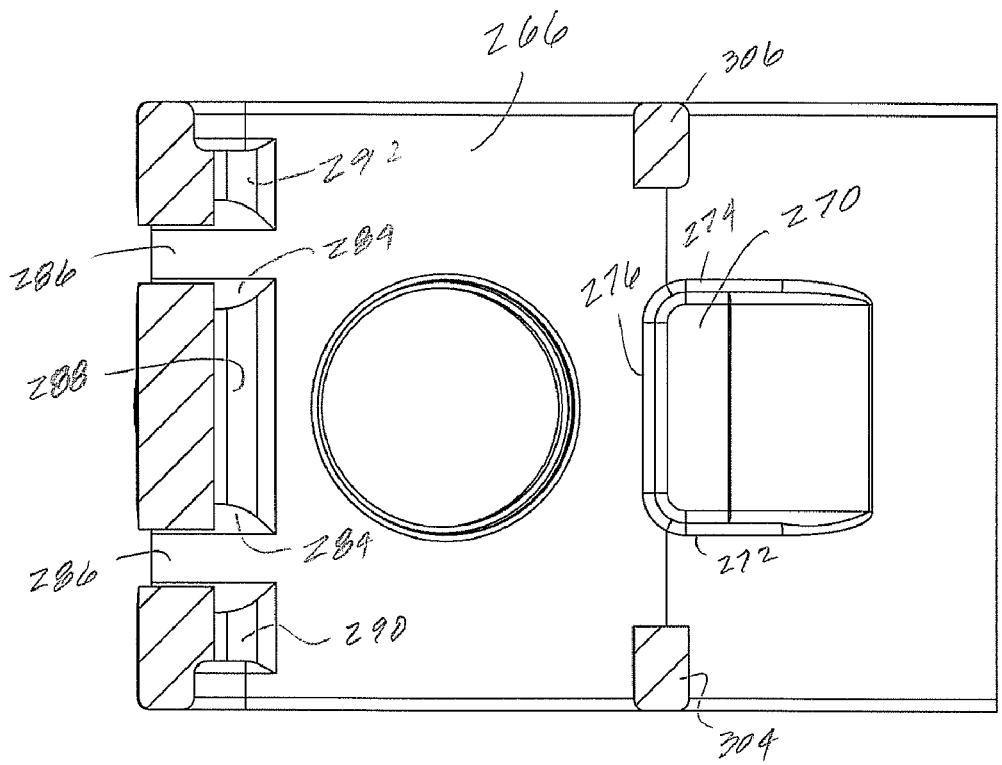
FIG. 13 is a horizontal transverse section of the clip of FIG. 5 taken along line 13-13 shown in FIG. 7.
Figure 14:
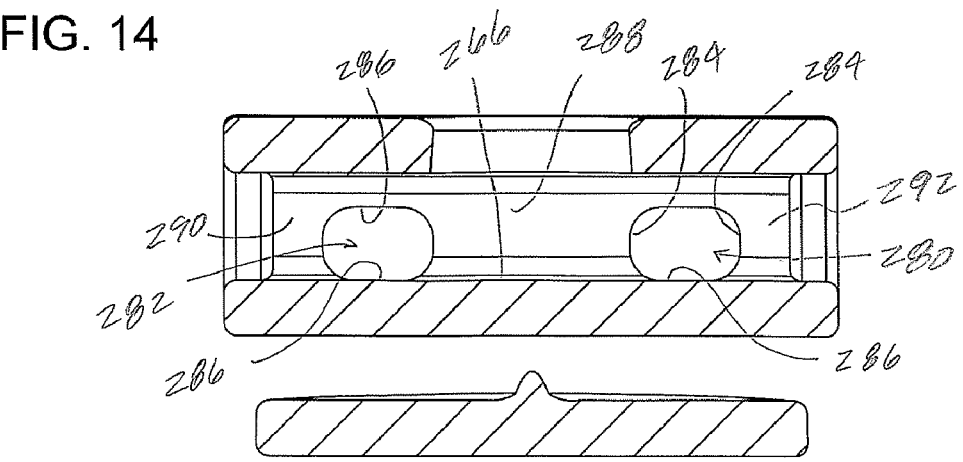
FIG. 14 is a vertical frontal section of the clip of FIG. 5 taken along line 14-14 shown in FIG. 7.
Figure 16:
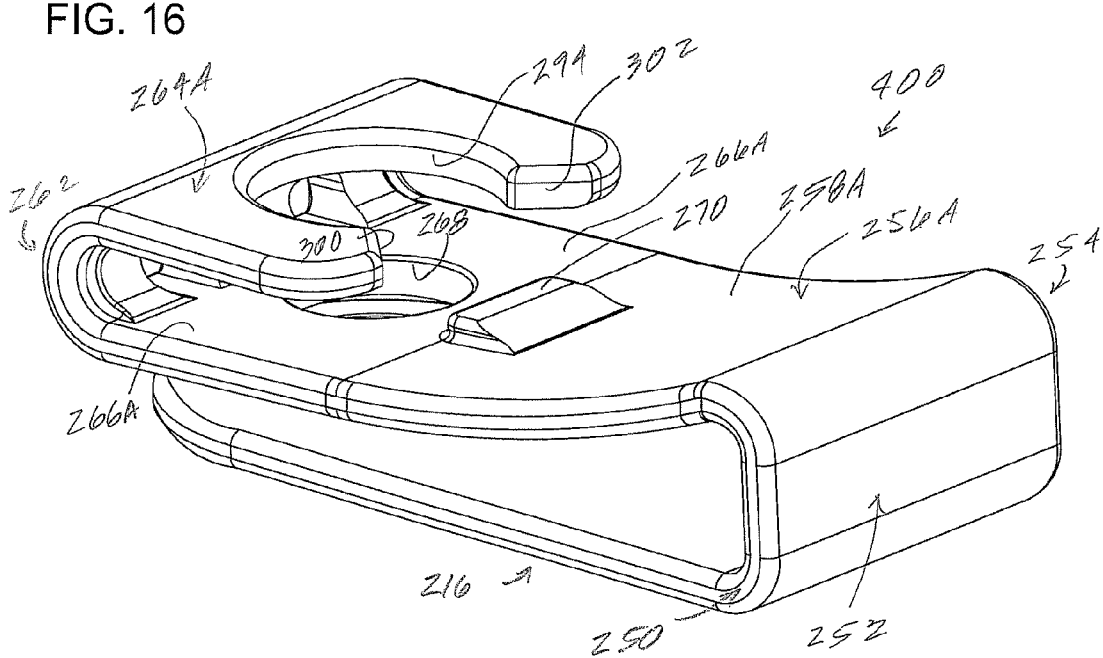
FIG. 16 is an upper rear isometric view of another example of a clip for use in a clip nut assembly.
Figure 17:
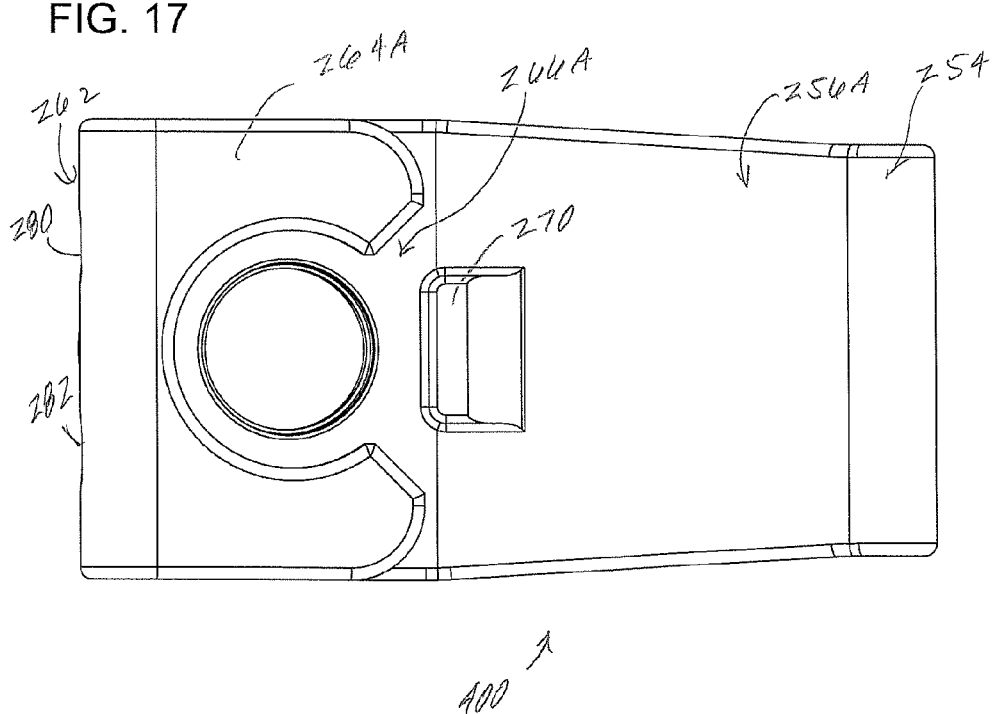
FIG. 17 is a top plan view of the clip of FIG. 16.
Figure 16A:
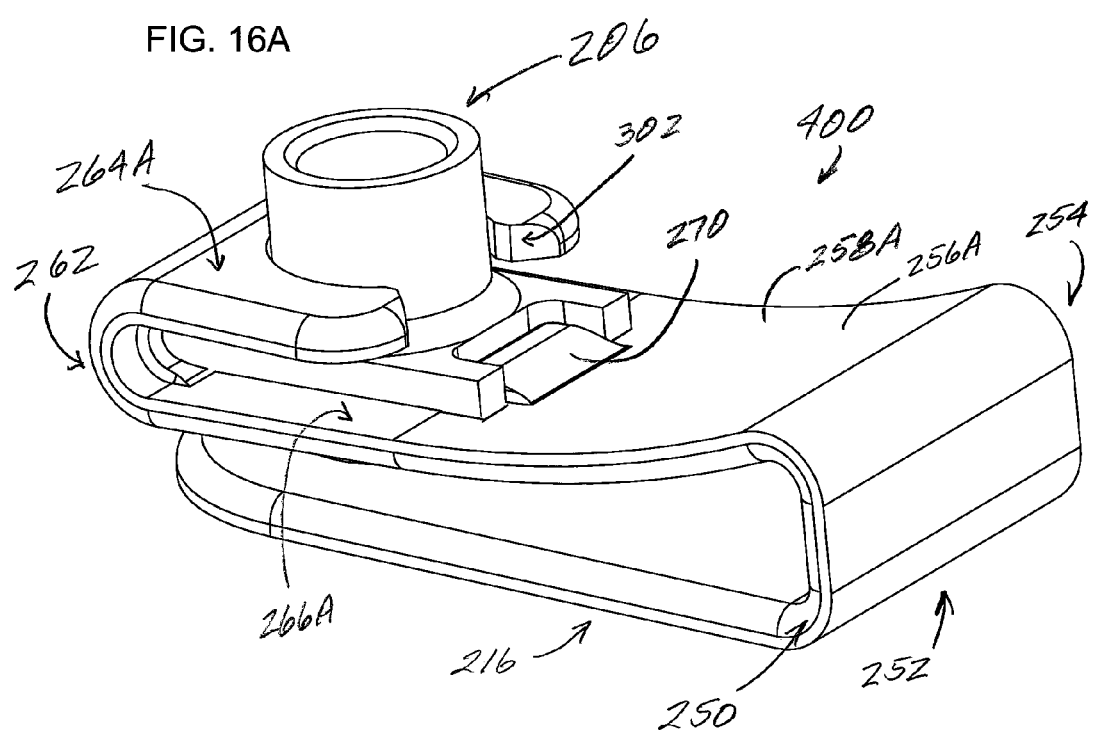
FIG. 16A is an upper isometric view of a clip nut assembly with the clip of FIG. 16 showing a nut element in place.
Figure 18:
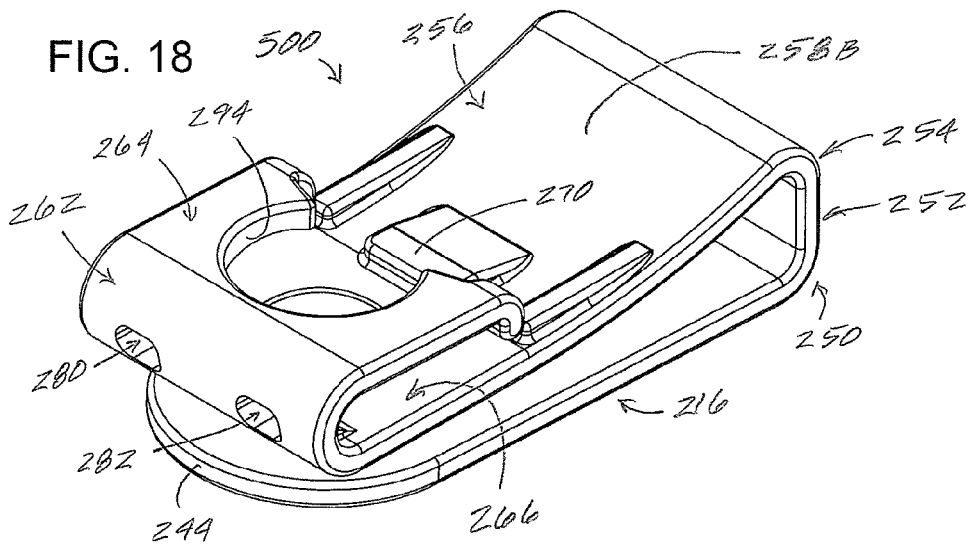
FIG. 18 is a front upper isometric view of another example of a clip for use in a clip nut assembly.

One or more additional walls may be provided interior or exterior to the transition wall 262 for providing additional bearing support. For example, an additional center wall 288 can be added to the inside of the transition wall 262 between the two openings 280 and 282 (FIGS. 5, 12 and 13-14). The center wall 288 extends from the nut support surface 266 to the underside of the cantilever wall 264. The center wall 288 joins first and second side wall elements 290 and 292 outside of the two openings 280 and 282. The center wall 288 and the side wall elements 290 and 292 extend widthwise of the transition wall 262 a distance less than the width of the clip. The thickness of the walls 288, 290 and 292 decreases as they taper toward the nut support surface 266 or the underside of the cantilever wall 264. As can be seen in FIGS. 13-14, the nut support surface 266 extends to the openings 280 and 282 and is continuous with the adjacent surfaces 286.

The cantilever wall 264 is a shelf or ledge supported by the transition wall 262 and extending over opposite portions of the nut support surface 266. In the example shown in FIGS. 2-15, the cantilever wall 264 is supported only by the widthwise junction with the transition wall 262. The cantilever wall is not supported from the third arm 256 at any other point. Since the nut element 206 is intended to be floating axially of the barrel 222 and also in short directions parallel to the nut support surface 266, the nut does not provide any significant support for the cantilever wall 264 in the present example. As a result, the cantilever wall 264 can flex toward or away from the rest of the clip, for example when a nut 206 is being inserted, or when the fastener 218 is starting to thread into the nut. Flexing can occur at the junction of the transition wall 262 and the cantilever wall 264 and/or along the plane of the cantilever wall 264, and/or at other locations. However, with plastic parts, greater flexing will occur in the areas of lower wall thickness. Additionally, because the cantilever wall is partly converging toward the third arm 256, the amount of float available to the nut is less than what it otherwise would be if the cantilever wall was exactly parallel to the nut support surface 266.

The cantilever wall 264 includes a partially circular wall 294 (FIG. 5) defining an opening 296 for aligning the barrel 222 of the nut 206. The opening 296 has a reduced-width entrance 298 for allowing the barrel of the nut to be pressed fit through the entrance and into the opening 296. Because of the minimum spacing defining the entrance being somewhat smaller than the outside diameter of the barrel 222, the barrel will not come out of the opening without a similar guiding force. The minimum spacing is defined by respective opposite walls, which may be flat, pointed, rounded or other configurations for providing an opening while helping to keep the nut in the opening 296.

The lead in to the entrance 298 is defined by a pair of diverging walls 300 and 302 (FIG. 5) extending outwardly from the respective side of the entrance to a pair of depending arms 304 and 306. The arms and the diverging surfaces help guide the nut into the nut cage. For example, the arms 304 and 306 help to guide the tabs and the base of the nut under the cantilever wall 264. The diverging walls also help to guide the tabs and the base. The arms 304 and 306 extend only part way downward to the nut support surface 266, and do not normally touch the nut support surface 266.

The nut 206 is inserted into the nut cage by directing one pair of the tabs of the nut between the arms 304 and 306 and under the diverging walls 300 and 302. The ramp 278 approaching the boss 270 helps to orient the tabs and the base of the nut somewhat parallel to the nut support surface 266. The barrel 222 is pressed through the opening 298. The tabs 228 and 230 are guided into the openings 280 and 282, and the tabs 232 and 234 are positioned on each side of the boss 270. During the insertion, the cantilever wall 264 may flex upward away from the clip to accommodate the nut element. As the nut element moves into position with the tabs 232 and 234 on each side of the boss 270, the nut settles onto the nut support surface 266, and the cantilever wall 264 returns to or in the direction of its relaxed state. The nut element can be removed by tilting the nut element upward to clear the boss 270 and pressing the barrel 222 of the nut element out of the opening 298.

In another example of a clip for a clip nut assembly, such as may form part of a fastener assembly, a clip 400 (FIGS. 16-17) is substantially identical to the clip 204 described with respect to the example of FIGS. 1-15 except that the third arm 256A has side edges that diverge from each other in the concave portion 258A to form a wider third arm. The third arm 256A is wider than the second arm 252. Additionally, the cantilever wall 264A extends widthwise the same distance as the nut support surface 266A, which is the greatest width for the third arm. Additionally, the cantilever surface 264A omits the depending arms 304 and 306, and a longitudinal length of the cantilever wall 264A (FIG. 17) is less than the length of the cantilever wall 264 (FIG. 6). The cantilever wall 264A forms a portion spaced apart from the nut support surface 266A on a side of the nut support portion opposite the first arm 216. The cantilever wall can move toward and away from the nut support surface 266A. The wider third arm 256A provides more support for the fastener and the adjacent panel, for example when the fastener is threaded down.

As with the other examples of clip nuts and nut assemblies, other support configurations can be used, including adding or changing bosses, support walls, cavities or openings in the support surfaces, and the like. The clip 400 is used with the nut 206 shown in FIG. 15. Other nut assembly combinations can be used with the clip, as desired.

In another example of a clip for a clip nut assembly, such as may form part of a fastener assembly, a clip 500 (FIG. 18-20) is substantially identical to the clip 204 with the addition of further bearing surfaces for supporting the nut. In the present example, the boss 270 provides a bearing surface for either one of the tabs 232 and 234 depending on which way the nut pivots. Additional bearing surfaces are provided through bosses 502 and 504 for supporting the respective tabs 234 and 232. The boss 502 includes an inside bearing surface 506 for supporting the outside wall of the tab 234. The inside wall of the tab 234 bears against the first wall 272 of the boss 270 when the nut pivots counterclockwise as viewed in FIG. 20.

Figure 20:
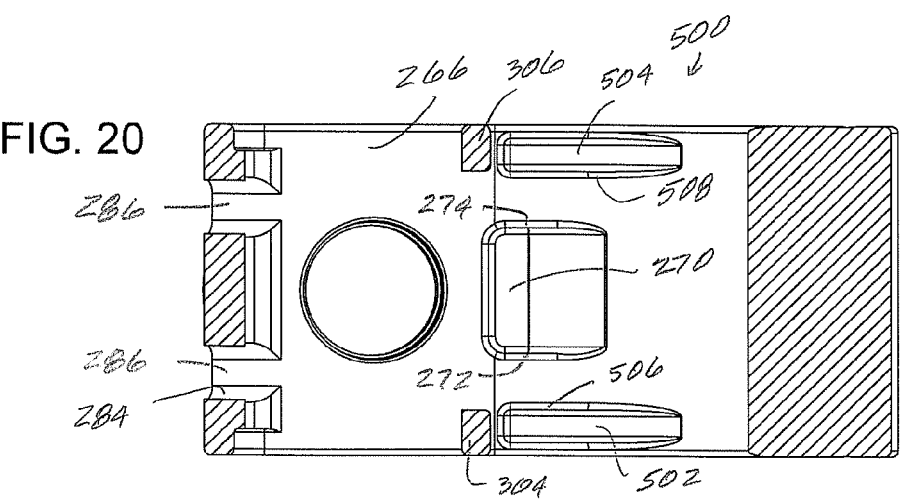
FIG. 20 is an upper horizontal transverse section view of the clip of FIG. 18 taken along a line similar to that of FIG. 13.
Figure 19:
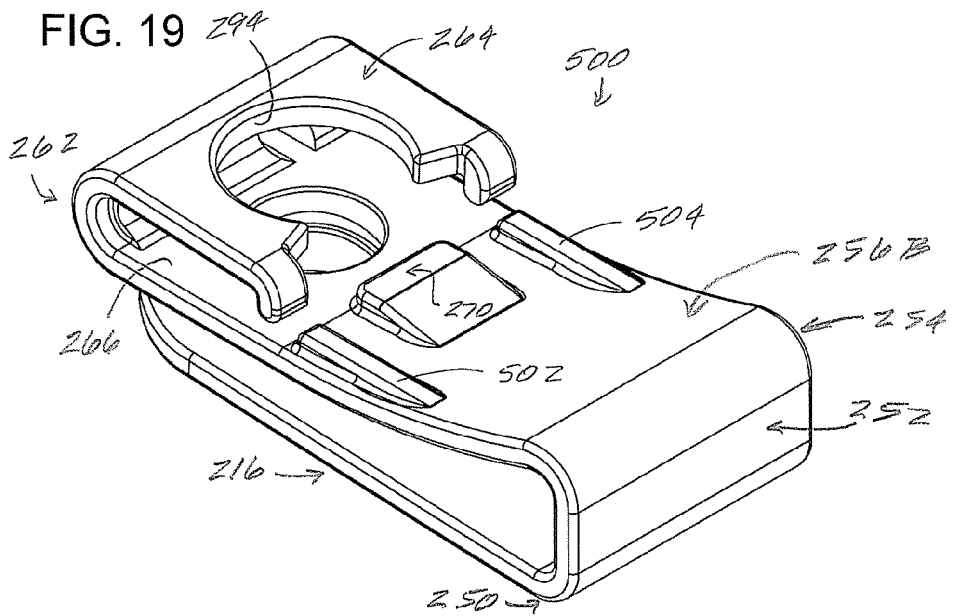
FIG. 19 is an upper rear isometric view of clip of FIG. 18.
Figure 21:
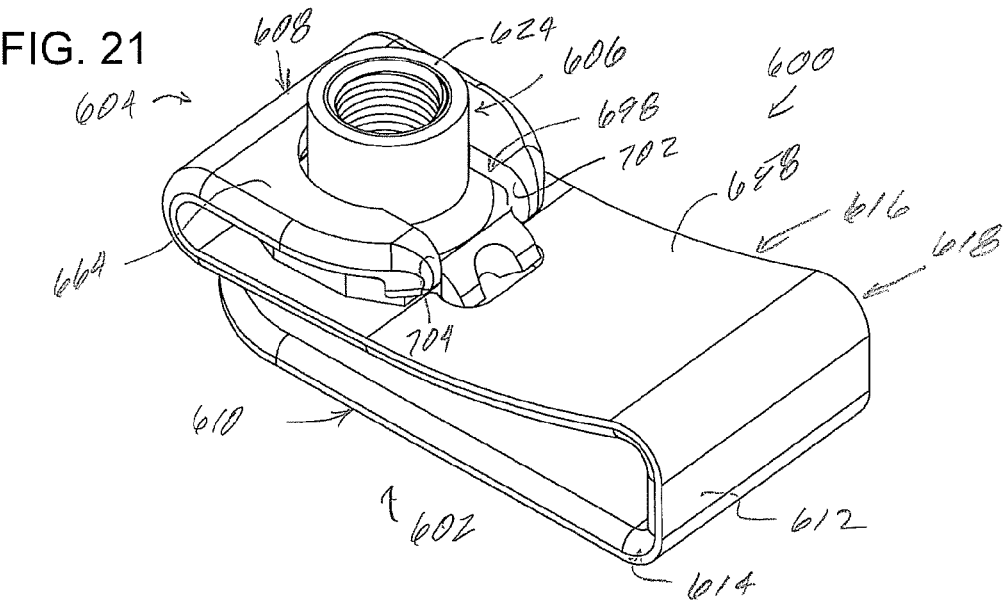
FIG. 21 is an upper rear isometric view of another example of a clip nut assembly for use in a fastener assembly.
Figure 22:
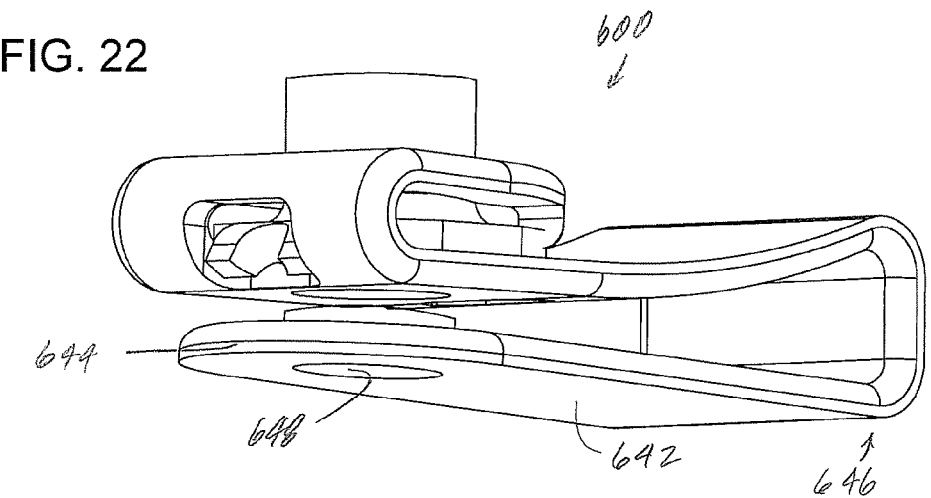
FIG. 22 is a lower front isometric view of the clip nut assembly of FIG. 21.
Figure 23:
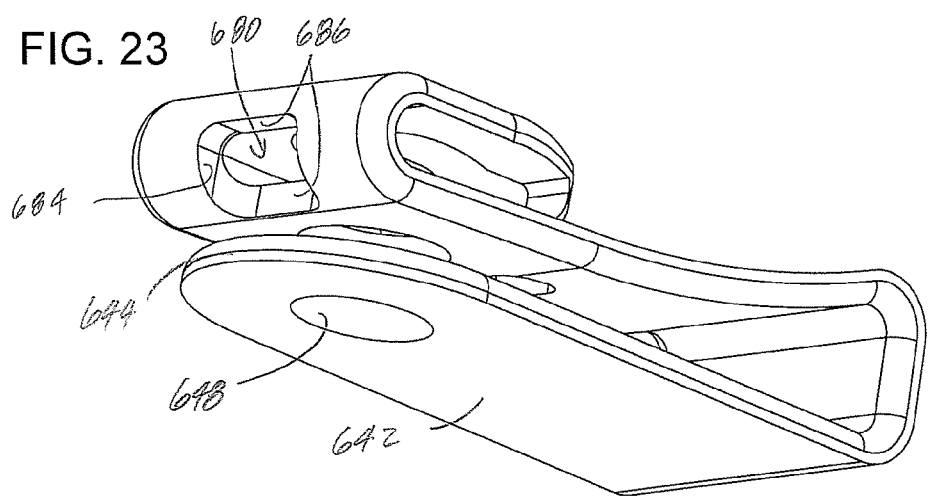
FIG. 23 is a lower front isometric view of the clip of FIG. 21.

The boss 504 includes an inside surface 508 that supports the outside surface of the tab 232 when the nut pivots counterclockwise as viewed in FIG. 20. When the nut pivots clockwise, the inside surface 506 supports the outside surface of the tab 234, and the second wall 274 on the boss 270 supports the inside surface of the tab 232.

Figure 15:
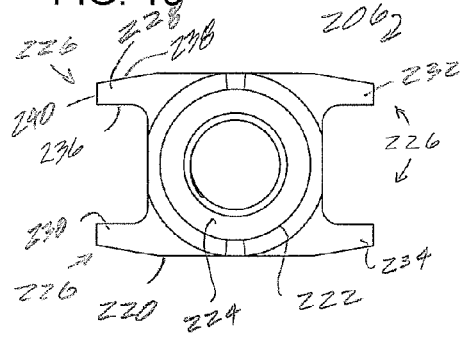
FIG. 15 is a top plan view of a nut element for use in the clip in the examples of FIGS. 2-14 and 16-20.
Figure 11:
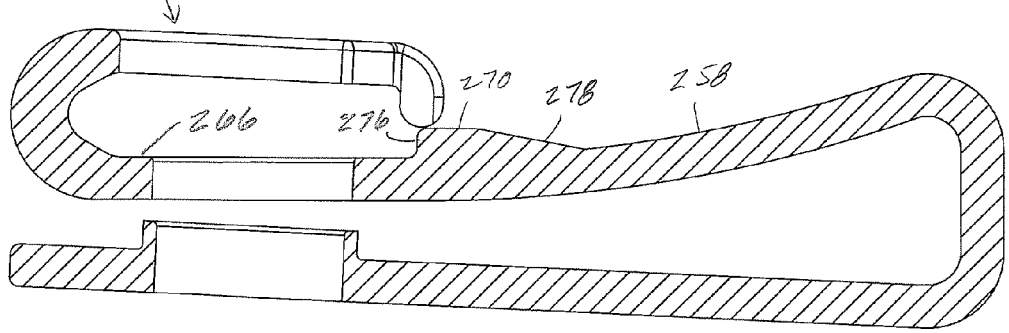
FIG. 11 is a longitudinal vertical section of the clip of FIG. 5 taken at the same location as that of FIG. 8.
Figure 12:
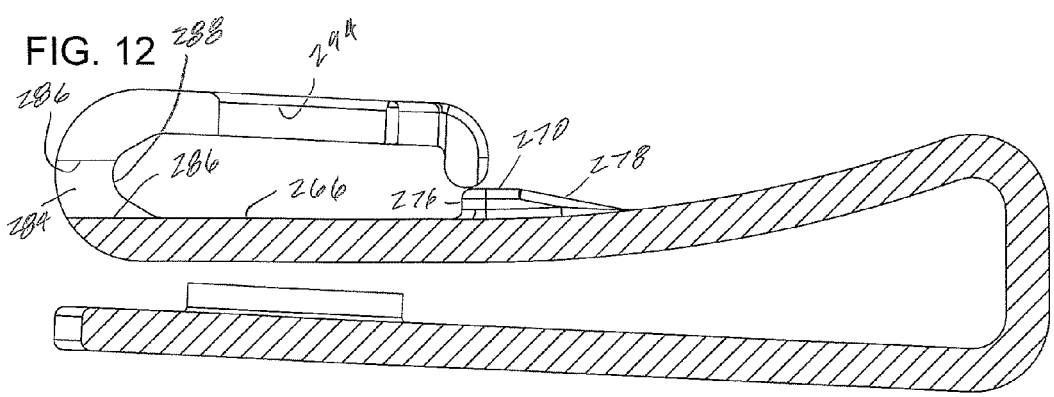
FIG. 12 is a longitudinal vertical section of the clip of FIG. 5 taken at the same location as that of FIG. 9.

The bosses 502 and 504 extend upwardly from the portion of the concave surface 258B adjacent the nut support surface 266. The bosses 502 and 504 can also be considered support walls formed inboard of the corresponding edge surfaces of the third arm 256B. The bosses 502 and 504 can also be positioned as support walls formed with outer walls substantially flush with the corresponding edge surfaces of the third arm 256B. The walls may include cavities or through openings for supporting corresponding projections on the nut, as a function of the configuration of those corresponding projections. Other configurations of bearing surfaces can also be used. In the example of the clip shown in FIGS. 18-20, the nut 206 of FIG. 15 is easily used. The nut is supported while under torque by the boss 270 and three outside support walls, namely transition wall 262, and the walls 502 and 504. Other bearing surface structures can be used as well or instead.

In another example of a clip nut assembly, such as may form part of a fastener assembly, a clip nut assembly 600 (FIGS. 21-31) includes a clip 602 having a nut support 604, which supports a nut 606 within a nut cage 608. The clip includes a first arm 610 joining a second arm 612 through a transition wall 614. The second wall 612 supports a third wall 616 through a transition wall 618. The transition walls have substantially constant curvature. The third wall 616 supports the nut cage 608.

As shown in FIGS. 27-30, the nut element 606 includes a base 620 supporting a generally cylindrical internally threaded portion in the form of a barrel 622. The barrel extends from the base 620 to an end surface 624 defining an opening for the barrel. The barrel may be substantially cylindrical in its inside and outside profile, or the barrel can be crimped to increase the frictional engagement with the fastener. In an alternative configuration, the nut can also be a beam nut, or other nut configurations.

In the present example, the base 620 of the nut has a substantially smooth bottom surface and a substantially smooth, flat upper surface. The upper surface curves from the flat surface upward to the perimeter surface of the barrel 622. The nut element 606 includes tips 626 extending outward and downward from the base 620. The tips 626 can take the form of projections, pads, arms, extensions, points or other structures which keep the base from having a circular perimeter or flat bottom surface. The tips 626 are arranged in pairs on each side of a transverse plane, and each pair extends along a longitudinal plane. The tips 628 and 630 in the first pair extend in a direction opposite to the tips 632 and 634 in the other pair. The tip 628, and each tip in the example of the nut 606, includes a substantially straight wall 636 forming an outside surface of the tip 628, and a semi circular surface 638 forming an inside surface of the tip 628. Each tip extends downward and ends at a transverse downwardly-facing flat wall 640. Depending on the configuration of the nut support, pivoting of the nut 606 may cause the straight surface on the tip 628 to contact a bearing surface, the straight surface on the tip 626 to contact a bearing surface, or a combination of surfaces contacting a bearing surface.

The nut is formed from metal and is symmetric about both the transverse and longitudinal planes. Consequently, the nut can be inserted into the clip in two orientations, one 180 degrees apart from the other.

The clip 602 includes the first arm 610 having a flat upper surface 642 extending between a substantially semi circular free end 644 and a support end 646. An interior wall 648 extends from the upper surface through the inside of the annular boss 610A for receiving the shank of a fastener such as fastener 218. The boss 610A extends inwardly from a substantially flat surface on the inside of the first arm 610, and aside from the boss 610A, the first arm has a substantially constant thickness. The opposite edges of the first arm and the semi circular free end 644 have substantially flat side walls with filets forming rounded corners between the side walls and the upper and inside surfaces of the first arm.

The transition wall 614 is a 90-degree curved transition having a substantially constant curvature extending from the support end 646 of the first arm and joins the first arm 610 to a second arm 612. The second arm 612 is substantially straight and has substantially flat outside and inside surfaces producing a substantially constant thickness for the second arm 612. The second arm extends widthwise of the clip substantially the same width as the first arm 610. The second arm 612 also may have filets or rounded edges between substantially flat side walls and the outside and inside surfaces. Additionally, the thicknesses of the first arm and the second arm and the transition wall 614 are substantially identical.

The transition wall 618 is a greater than 90-degree transition wall joining the second arm 612 to a third or lower arm 616. The transition wall 618 has a substantially constant curvature, and like the transition 614, has a substantially constant thickness. The transition wall 618 can include filets or rounded edges.

The third or lower arm 616 includes a slightly concave curving portion 658 extending from the transition 618 to the nut cage 608. The concave portion 658 supports the nut cage and the nut element 606 during installation and assembly of the fastener assembly and components. The third arm 616 extends along the concave portion 658 to a substantially flat nut support portion 660, which extends a distance approximately indicated by 660A (FIG. 24). The nut support portion 660 terminates at a substantially constant curvature transition wall 662 curving around slightly more than 180 degrees to a cantilever wall 664, forming part of the nut cage 608. The cantilever wall 664 is substantially straight and flat, except for two tabs at the end of an inwardly curving edge portion. The cantilever wall 664 extends toward the second wall 612 and converges slightly toward the third wall 616. The cantilever wall 664 forms a portion spaced apart from the nut support portion 660 on a side of the nut support portion opposite the first arm 610. The cantilever wall can move toward and away from the nut support portion 660. The third arm, the transition wall 662 and the cantilever arm 664 extend widthwise the same width as the second and the first arms, and the peripheral edge walls include flat surfaces joining the widthwise extending surfaces through filets or radius edges. The thickness of the third arm 616 and the cantilever wall 664 and the transition wall 662 are substantially all the same, and substantially the same thickness as the second and first walls.

The nut support portion of the nut cage includes a substantially flat nut support surface 660 (FIG. 26). The nut support surface extends sufficiently widthwise to support the base of the nut 606, both when the nut is allowed to float and when the nut is secured against the support surface 660 by the fastener 218. The nut support surface 660 extends approximately the distance 660A for supporting the nut, and may include a portion extending into the transition wall 662, described more fully below. A wall 668 (FIG. 27) is formed in the nut support portion for allowing the shank of the fastener 218 to access the nut 606.

A cavity or opening 670 extends into and in the present example through the nut support surface 660. The opening 670 forms one or more bearing surfaces against which the nut 606 can bear while the nut is under torque. The opening includes a first side surface 672 (FIG. 24), a second side surface 674 (FIG. 24) and a transverse surface 676 (FIG. 28), any one or more of which surfaces the nut can bear against. The first, second and transverse surfaces are configured so as to substantially complement the outer surfaces of the tabs 626 of the nut 606. Either tab of the nut can be positioned in the opening 670, and where the opening is formed as two openings, each tab would extend into a respective opening. While the opening can take other configurations, conforming to the adjacent surfaces of the nut provides significant bearing support. The tabs extend into the openings approximately half their length below the lower surface of the nut base. The tabs can extend higher or lower within the opening, but the existing depth provides suitable support to the nut under torque in the present configuration of the clip nut.

The opening 670 is substantially centered widthwise of the clip and is substantially symmetrical about the longitudinal plane of the clip. In this configuration, there is a substantial mass of third arm material surrounding the opening 670, which can provide material support to the walls of the opening when the nut is under torque. The opening is a significant distance from each of the side edges of the clip. Additionally, the opening is a significant distance from the opening 668 and from the transition wall 612.

When the nut element 606 is under torque, for example in the counterclockwise direction as viewed in FIG. 24, the tab 632 contacts the second side surface 674 of the opening, and the tab 634 moves slightly away from the opening wall 672. In this configuration of the nut and the opening 670, the opening 670 provides at least one point of contact for the nut element.

In the example shown in FIGS. 21-31, the nut support surface 660 is substantially flat from the opening 670 forward to the beginning of the transition wall 662, and the nut support surface 660 has no bearing surfaces for the base of the nut 606 between the opening 670 and the transition wall 662. Additionally, no wall portions or other peripheral edge structures extend upwardly from the third arm 616.

The transition wall 662 includes at least one wall opening 680, and may include two, (FIG. 23) extending from the inside of the transition wall 662 to the outside. The opening is defined by an arcuate cut through the transition wall forming in side cross section such as shown in FIG. 27 a right-angled opening. The opening includes oppositely facing side walls 684 and oppositely facing upper and lower walls 686 defining the openings (FIGS. 22-23 and 27-28). The walls of the opening form bearing surfaces for supporting the tabs 628 and 630 extending downward from the perimeter of the base of the nut element. If the nut 606 pivots counterclockwise as viewed in FIG. 24, the tip 630 will contact the side wall 684 of the opening and bear against the walls while the nut is under torque. In the configuration of the present example, the bearing surfaces in the nut cage 608 provide two points of contact for supporting the nut while it is under torque. Similarly, two-point contact would support the nut 606 if it pivots in the clockwise direction as viewed in FIG. 24. Three point contact could occur if one of the openings was formed as two openings with respective sidewalls, and four point contact could occur if both openings were formed as four openings total.

In the example of FIGS. 24-31, bearing surfaces are provided for the nut through a combination of cavities or opening walls extending through the nut support surface and the transition wall. Additional openings can be used, additional bosses, additional support walls, cavities or other openings in the nut support or other bearing surfaces can be provided to give additional points of contact or alternate bearing surface configurations. Additionally, the nut can include additional tabs or other elements for bearing against a bearing surface when the nut is under torque.

One or more additional walls (not shown) may be provided interior or exterior to the transition wall 662 for providing additional bearing support. For example, additional first and second side wall elements outside of the opening 680 can add bearing support to the transition wall around the opening 680. The side wall elements may extend widthwise of the transition wall 662 a distance less than the width of the clip. The thickness of the side wall elements may decrease as they taper toward the nut support surface 660 or the underside of the cantilever wall 664.

The cantilever wall 664 is a shelf or ledge supported by the transition wall 662 and extending over opposite portions of the nut support surface 660. In the example shown in FIGS. 21-31, the cantilever wall 664 is supported only by the widthwise junction with the transition wall 662. The cantilever wall is not supported from the third arm 616 at any other point. Since the nut element 606 is intended to be floating axially of the nut barrel and also in short directions parallel to the nut support surface 660, the nut does not provide any significant support for the cantilever wall 664 in the present example. As a result, the cantilever wall 664 can flex toward or away from the rest of the clip, for example when a nut 606 is being inserted, or when the fastener 218 is starting to thread into the nut. Additionally, because the cantilever wall is partly converging toward the third arm 616, the amount of float available to the nut is less than what it otherwise would be if the cantilever wall was exactly parallel to the nut support surface 660.

The cantilever wall 664 includes a partially circular wall 694 (FIG. 28) defining an opening 696 for aligning the barrel 622 of the nut 606. The opening 696 has a reduced-width entrance 698 (FIG. 21) for allowing the barrel of the nut to be press fit through the entrance and into the opening 696. Because of the minimum spacing defining the entrance being somewhat smaller than the outside diameter of the barrel 622, the barrel will not come out of the opening without a similar guiding force.

The lead in to the entrance 698 is defined by a pair of walls 700 and 702 (FIG. 21) extending from each side of the entrance to a pair of depending arms 704 and 706. The arms and the surfaces help guide the nut into the nut cage. For example, the arms 704 and 706 help to guide the tabs and the base of the nut under the cantilever wall 664. The walls also help to guide the tabs and the base. The arms 704 and 706 extend only part way downward to the nut support surface 660, and do not normally touch the nut support surface 660.

The nut 606 is inserted into the nut cage by directing one pair of the tabs of the nut between the arms 704 and 706 and under the walls 700 and 702. The barrel 622 is pressed through the opening 698. The tabs 628 and 630 are guided into the opening 680, and the tabs 632 and 634 are positioned in the opening 670. During the insertion, the cantilever wall 664 may flex upward away from the clip to accommodate the nut element. As the nut element moves into position with the tabs 632 and 634 in the opening 670, the nut settles onto the nut support surface 660, and the cantilever wall 664 returns to or toward its relaxed state. The nut element can be removed by tilting the nut element upward to clear the opening 670 and pressing the barrel 622 of the nut element out of the opening 698.

To assemble the combination, the clip nut assembly 202 of FIG. 2 is placed over the panel 210 so that the annular boss 214 engages the opening 212. The opening 212 may be positioned so that the edge of the panel rests against the back wall of the clip. A plurality of clip nuts may be mounted to the panel 210 and then the component 210A and associated fastener 218 are placed against the first arm 216. The fastener 218 is pressed through the opening in the annular boss 214 and threaded into the nut 206. When the fastener 218 first encounters the threads of the nut, the nut cage 208 and the nut 206 are biased away from the panel 210, until the threads of the fastener 218 engage and advance into the nut 206. Further threading of the fastener 218 pulls the nut and reduces the flexing force directed against the cantilever wall. Further threading of the fastener 218 also pulls the nut and the clip against the panel 210 and secures all the components together. When the fastener is seated, the base of the nut element, the nut support surface and the first arm are all substantially parallel, and the cantilevered wall may be in its relaxed configuration, for example converging toward the third arm supporting the nut.

In the present examples, the clip including the nut support of the fastener assembly is formed from a non-metal material. In the present examples, one material is TORLON, and other poly-amide imides as well as other structural plastics or polymers can be used, including among others; Vespel or Aurum (PI), Ultem (PEI), Victrex or Ketaspire (PEEK), Primospire (SRP), Polycarbonate, or Epoxide or Phenolic synthetic resins. The material can also be a composite material and may include fiber reinforcement or other strengthening materials. In these examples, only the nut and the bolt of the fastener assembly are formed from a metal. Clips formed from non-metal materials with these or similar characteristics provide relatively high strength, and long lasting components that have relatively high resistance to corrosion. Additionally, molding of clips using such materials also permits manufacture of a number of clip configurations that can incorporate easily one or more of the features described herein.

The clips of FIGS. 2-31 and the nut cages of the examples herein can be formed both entirely of the same material or different materials, can be a monolithic component, and they can be molded from the same material, or molded of different materials.

Figure 32:
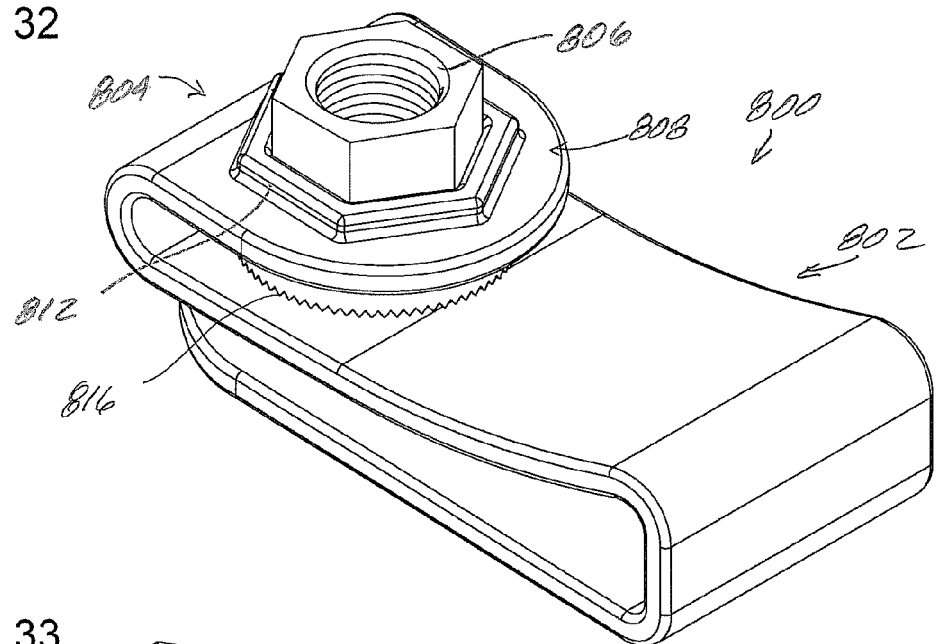
FIG. 32 is a rear isometric view of another example of a clip nut assembly using a serrated nut for use in a fastener assembly.
Figure 33:
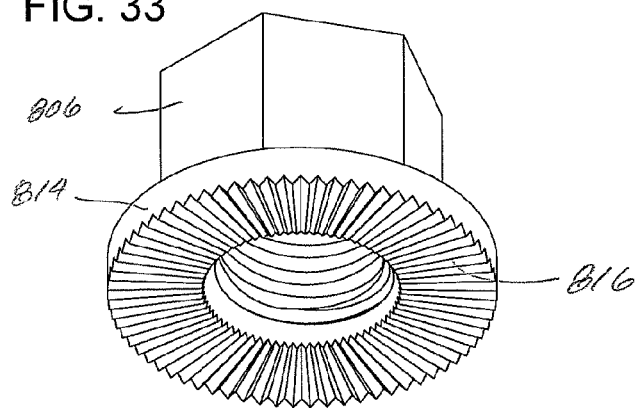
FIG. 33 is a lower isometric view of a serrated nut for use in the clip nut of FIG. 32.

In another example of a clip nut assembly, such as may form part of a fastener assembly, a clip nut assembly 800 (FIGS. 32-33) includes a clip 802 supporting a nut assembly 804. The nut assembly 804 includes a nut 806 supported in a nut cage 808. The clip 802 may take the form of any of the clips described herein, and can be used in the same way. The clip includes a cantilever wall 810 having a hexagonal opening 812 for receiving a hexagonal segment of the nut 806. In the configuration shown in FIG. 32, the hexagonal segment engages complementary walls forming a hexagonal opening in the cantilever wall 810, forming bearing surfaces for resisting twisting of the hex nut. In other examples, the hexagonal opening could have a hexagonal or other non-circular wall defining the opening (while preferably conforming to the shape of the nut barrel), and a complimentary outer buffer area that is the same shape as the opening, or a shape that is different from the shape of the opening. For example, the buffer area may be round, square, other polygon or other shape. Additionally, the buffer area may extend upward from the surface of the cantilever wall higher and even to the top of the nut or higher, and/or the buffer area may extend below the surface of the cantilever wall 810.

The non-circular opening in the cantilever wall 810 combined with a non-circular barrel on the nut help to limit or prevent nut rotation, for example during initial threading of the bolt into the nut, or at the end of reverse threading of the bolt out of the nut. The non-circular opening and barrel also help to limit or prevent rotation or pivoting of the nut at other times during bolt rotation.

Other non-circular surfaces can be used about the perimeter of the nut to engage walls or bearing surfaces on the clip for limiting or preventing pivoting between the nut and the clip. The non-circular can take any of the configurations referenced herein. When the nut is under torque, the non-circular surfaces engage the bearing surfaces to limit or prevent pivoting between the nut and the clip.

The hex nut 806 includes a base wall 814. In this example, the base wall 814 includes serrations 816 on the bottom surface thereof. The serrations provide an easy and efficient way to have a relatively large number of engagement positions. When the hex nut 806 is pulled against the third arm of the clip by the fastener, the serrations 816 bear against the nut support surface of the clip, thereby resisting rotation through the serrations, which may be considered tabs or projections, in combination with the hex surfaces. The surface of the nut support may be smooth or may include complementary serrations or other discontinuities. The nut support surface contacted by the serrations are bearing surfaces as to which the engagement positions between them and the serrations limit or prevent rotation or pivoting of the nut relative to the nut cage 808. The nut support surface extending or positioned between the serrations and the panel 210 or other external element keeps the serrations from contacting the panel and also promotes the limitation or prevention of rotation between the nut and the clip. In this example, both the serrations and the hex nut 806 help to limit or prevent rotation of the nut relative to the clip. The serrations help to limit or prevent rotation while the serrations contact the nut support surface, and the hex nut 806 helps to limit or prevent rotation between the point when the nut is secured and the point when the bolt or other fastener component is fully disengaged from the nut. The hex nut 806 helps to limit or prevent rotation relative to the clip when the serrations are not in contact with the nut support surface.

In another example of a clip nut assembly, any of the clips described with respect to the examples of FIGS. 2-20 can be used with a serrated nut 818. The serrations 820 engage the underlying nut support surface to limit rotation relative to the nut support upon application of torque. The serrations constitute tabs, projections or other elements for bearing against a bearing surface.

In other examples, the serrations in any of the nut examples can be substituted by knurling or diamond points or other engagement portions. Serrations or knurling or diamond points, for example, provide a relatively large number of contact points, lines or planes to accommodate the loading while the nut is under torque.

Additional examples of clips are shown in FIGS. 35-45. The examples of FIGS. 35-45 configurations as to which a nut can be loaded or inserted into the clip in a number of ways, including from the front, from the side, from the back and from above. As to each of these examples, the clip can be configured to accept any of the nuts referenced herein, and they can be formed, molded or otherwise produced in accordance with the methods, materials and configurations otherwise described herein. Any part or parts of the clip can incorporate one or more of the features of the clips described herein.

In another example of a clip, a clip 900 (FIGS. 35-37) can receive a nut inserted from either side, from the upper front, from the upper back or directly downward from the top. The nut support 960 includes a forward transition wall 962A that can flex relative to the nut support 960. The forward transition wall 962A can be formed from a pair of 90 degree transitions 962B and 962C connected by a substantially planar wall 962D. The transition 962C can be formed with a thickness less than that for the wall 962D. The transition 962C supports a downwardly extending cantilever wall 964A extending over part of the nut support surface 966. The cantilever wall 964A includes angled side walls 9300 converging toward respective rounded surfaces 9302 forming part of an entrance restriction comparable to the entrance opening 298 in FIG. 5. A partially circular wall 994 receives a portion of the barrel of the nut for helping to hold the nut in place.

A back wall 9400 extends upwardly from the nut support 960 substantially parallel to and a mirror image of the forward transition wall 962A and the cantilever wall 964A the cantilever wall 964B on the back wall 9400 is a substantial mirror image of the cantilever wall 964A and helps to hold the nut in position. The cantilever walls and to some extent the forward and back walls can flex, allowing insertion of a nut from either side, from upper front, from upper back or from above.

As with any of the configurations of the clips in FIGS. 35-45, the structures supporting and retaining the nut, for example a nut cage, can be configured with a number of bearing surfaces against which projections or contact surfaces on the nut can bear when the nut is under torque, for example bosses, cavities, openings, walls and the like. These bearing surfaces can also include flats or other non-circular portions on the cantilever walls 964A and 964B.

Figure 34:
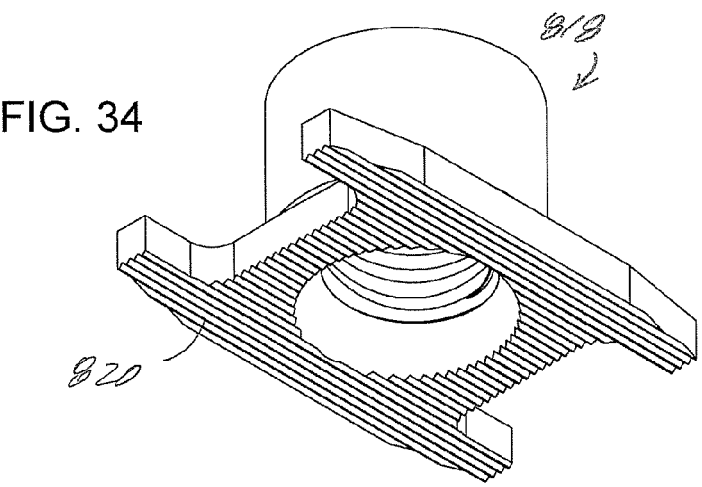
FIG. 34 is a lower isometric view of another example of a serrated nut for use in a clip nut.
Figure 35:
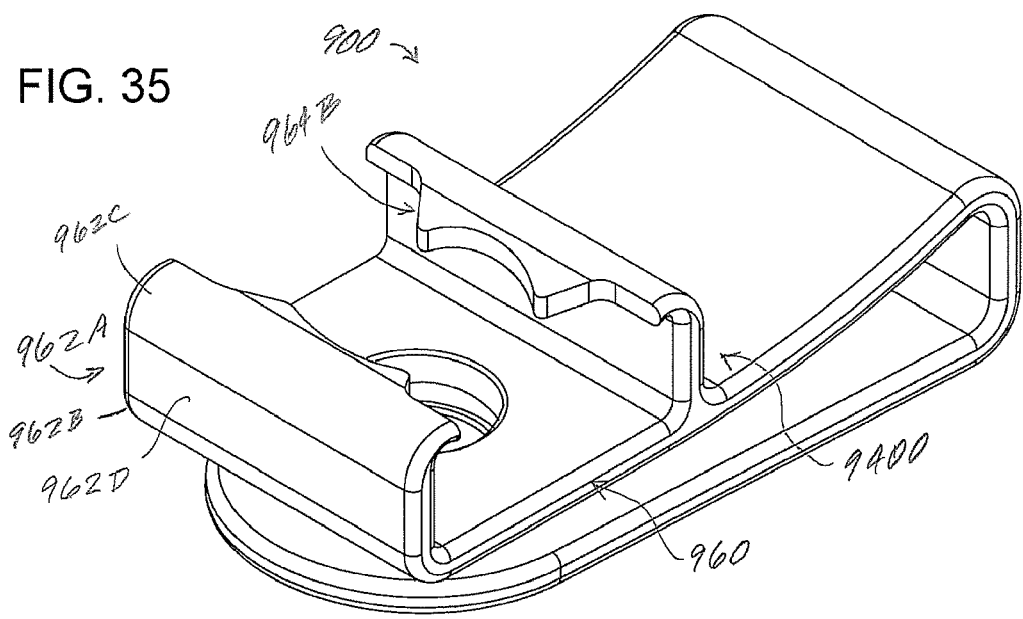
FIG. 35 is an upper front left isometric view of another example of a clip incorporating features that can be used with any of the nuts as described herein.
Figure 36:
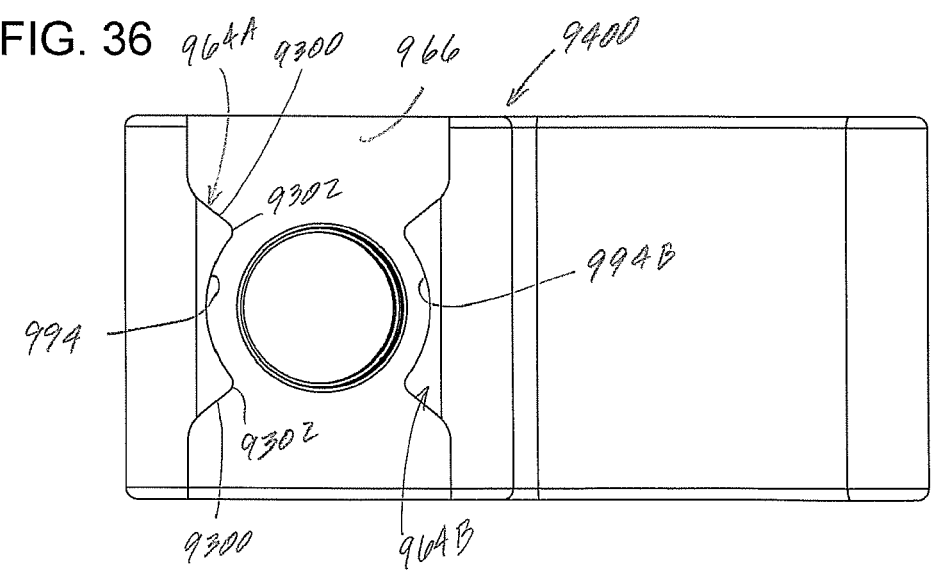
FIG. 36 is a top plan view of the clip of FIG. 35.
Figure 37:
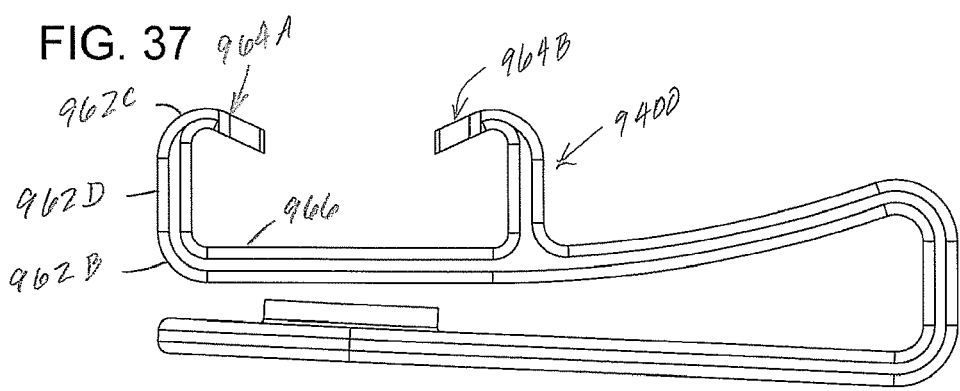
FIG. 37 is a side elevation view of the clip of FIG. 35.
Figure 38:
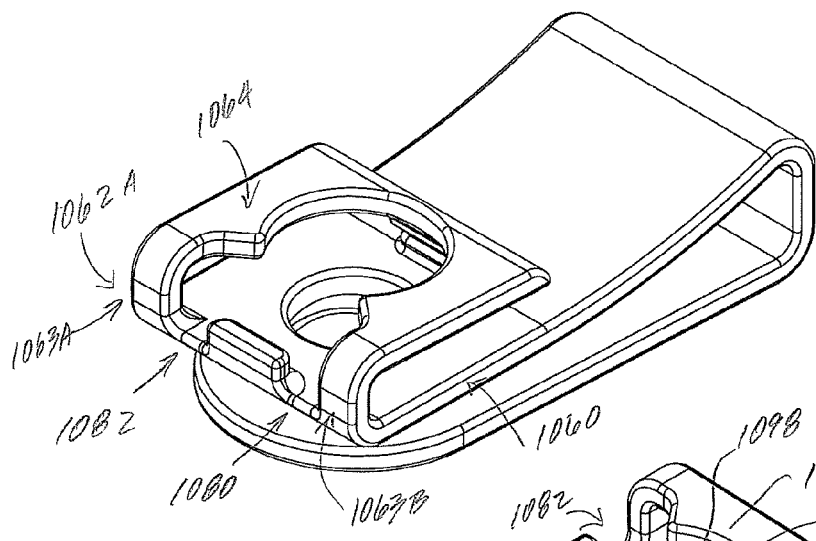
FIG. 38 is an upper front left isometric view of another example of a clip incorporating features that can be used with any of the nuts as described herein.
Figure 39:
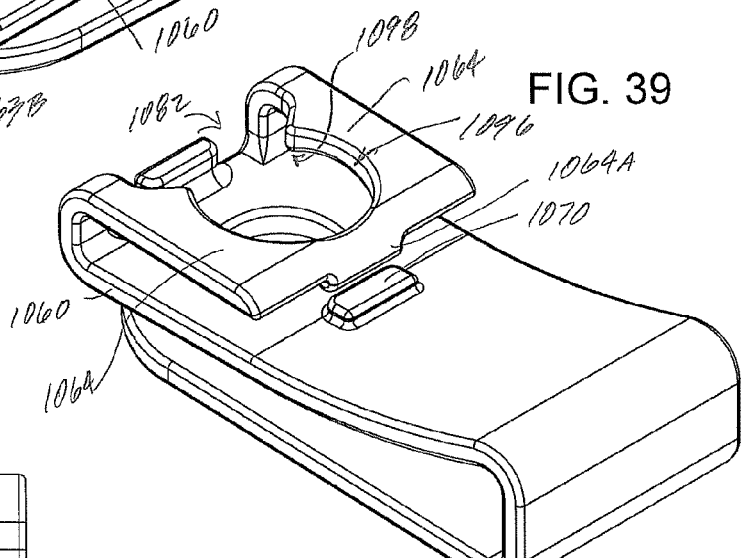
FIG. 39 is an upper rear isometric view of the clip of FIG. 38.
Figure 40:
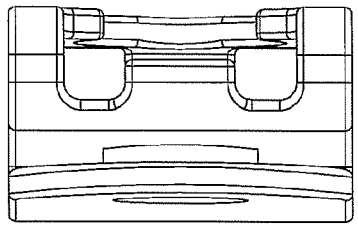
FIG. 40 is a front elevation view of the clip of FIG. 38.
Figure 41:
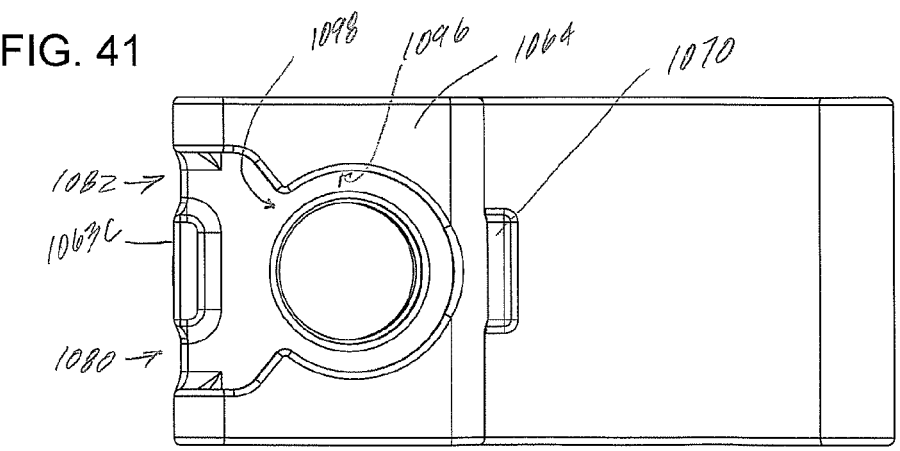
FIG. 41 is a top plan view of the clip of FIG. 38.
Figure 42:
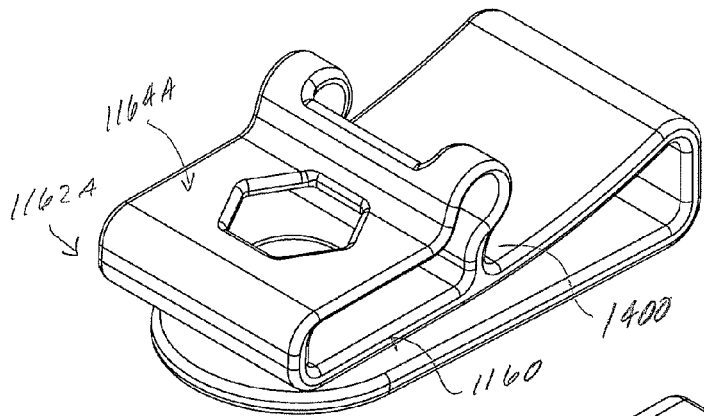
FIG. 42 is an upper front left isometric view of another example of a clip incorporating features that can be used with any of the nuts as described herein.
Figure 43:
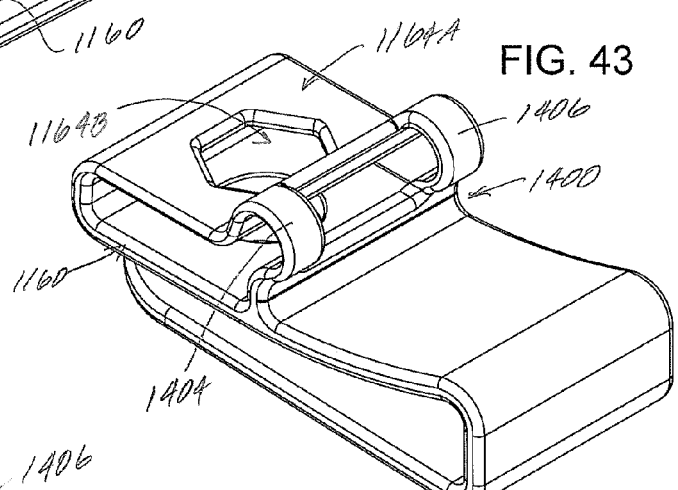
FIG. 43 is an upper a left rear isometric view of the clip of FIG. 42.
Figure 44:
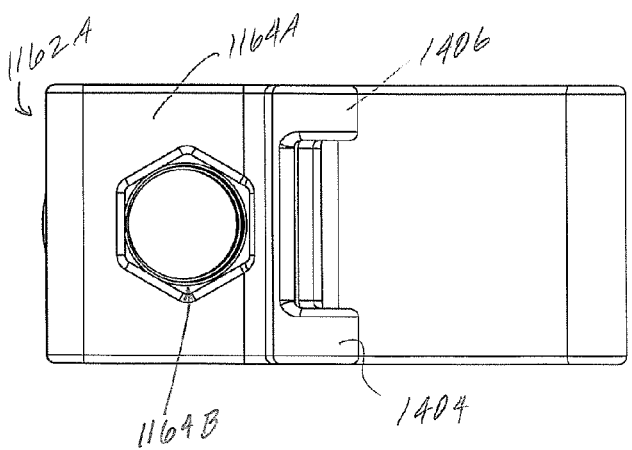
FIG. 44 is a top plan view of the clip of FIG. 42.
Figure 45:
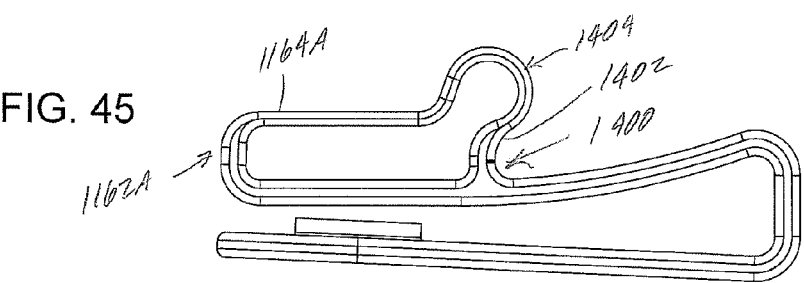
FIG. 45 is a side elevation view of the clip of FIG. 42.

In a further example of a clip, a clip 1000 (FIGS. 38-41) can receive a nut inserted from the front, either side or the back. The nut support 1060 includes a forward transition wall 1062A that can flex relative to the nut support 1060 having left and right portions 1063A and 1063B supporting a cantilever wall 1064. The cantilever wall 1064 forms a portion spaced apart from the nut support portion 660 on a side of the nut support portion opposite the first arm. The cantilever wall can move toward and away from the nut support 1060. A forward bearing wall 1063C helps to define forward openings 1080 and 1082 for receiving respective projections or tabs on a nut, such as that shown in FIG. 15 or FIG. 34. A boss 1070 extends upward from a back portion of the nut support 1060 forming bearing surfaces in a manner similar to that described herein.

The cantilever wall 1064 includes an opening 1096 and an entrance gap 1098 for receiving a barrel of a nut. A boss or second cantilever wall 1064A extends downwardly from the cantilever wall 1064 toward the boss 1070 and helps to keep the nut from rotating out, for example at the beginning of threading or when the nut is biased upward against the under surface of the cantilever wall 1064.

In another example of a clip, a clip 1100 (FIGS. 42-45) can receive a nut from either side or from the back. The nut support 1160 includes a forward transition wall 1162A that can flex or bend relative to the nut support 1160. The wall 1162A helps to the support a nut retaining wall 1164A, which may have a thickness less than the thickness of the transition wall 1162A, making easier the bending of the wall 1164A relative to the rest of clip. The wall 1164A includes a hexagonal opening 1164B serving the same function as that described herein for the clip 800 shown in FIG. 32.

A back wall 1400 extends upwardly from the nut support 1160 10 substantially parallel to the forward wall 1162A to a backward-curving wall 1402 supporting right and left bending support walls 1404 and 1406, respectively, supporting the wall 1164A. The support walls 1404 and 1406 may be approximately the same thickness as the wall 1164A. The support walls 1404 and 1406 are formed so as to bias and supports the wall 1164A in the position shown in FIGS.

42-45, while allowing the wall to bend upward away from the nut support 1160 for insertion of a nut or when threading of the nut first begins.

While any of the clip nut combinations described herein can rotationally fix the nut in place during normal usage, it is preferred to allow some rotational movement of the nut relative to the clip. Additionally, it is also preferred that when the nut is under torque, any projections or tabs or other surfaces that are intended to engage bearing surfaces on the clip when the nut is under torque preferably contact those bearing surfaces substantially simultaneously, or if not simultaneously, all of the surfaces intended to engage bearing surfaces on the clip achieve the intended engagement.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

The invention claimed is:

1. A clip comprising:
a non-metal clip having opposed first and second arms movable with respect to each other at respective first ends of the arms, and also having first and second walls defining respective first and second openings in the first and second arms; and
a third portion spaced apart from the second arm on a side opposite the first arm and joined to the second arm at a second end portion opposite the first end of the second arm and wherein the second end portion includes a wall defining a first cavity configured for receiving within the cavity a portion of a nut element and wherein the second arm includes an engagement surface extending from the second arm in a direction away from the first arm and positioned on the second arm on a side of the second opening in the second arm opposite the first cavity and configured such that the third portion can move toward and away from the second arm.

2. The clip of claim 1 wherein the third portion is non-parallel to the second arm.

3. The clip of claim 2 wherein the third portion includes a wall defining an opening in the third portion configured to receive a portion of a nut.

4. The clip of claim 3 further including a nut between the third portion and the second arm with a barrel extending into the opening.

5. The clip of claim 1 wherein the cavity in the third portion includes a wall defining an opening for a portion of a nut element.

6. The clip of claim 5 further including a flexible joinder element configured to allow the third portion to move relative to the second arm.

7. The clip of claim 1 wherein the third portion extends widthwise from a first side portion to a second side portion of the second arm and configured so as to permit receipt of a nut element from at least one of the first and second side portions.

8. The clip of claim 7 wherein the third portion is configured to flex upon insertion of a nut element at one of the first and second side portions.

9. The clip of claim 1 further including a nut element positioned adjacent the third portion.

10. The clip of claim 9 wherein the nut element includes a body portion having an external shape, a part of which is complementary to a shape on the third portion.

11. The clip of claim 9 further including a nut element support and wherein the first cavity and the engagement surface form a plurality of engagement surfaces adapted to engage the nut element.

12. The clip of claim 11 wherein the plurality of engagement surfaces extend above the nut element support.

13. The clip of claim 11 wherein the plurality of engagement surfaces extend the nut element support surface.

14. The clip of claim 11 wherein the plurality of engagement surfaces are positioned on an interior portion of the nut element support.

15. The clip of claim 11 wherein the nut element includes a nut body supported on the nut element support.

16. The clip of claim 15 wherein the nut body includes a non-circular engagement surface.

17. The clip of claim 15 wherein the nut body includes engagement surfaces configured to engage upward projections on a nut support surface.

18. The clip of claim 17 wherein the engagement surfaces on the nut body are configured to engage bearing surfaces on an interior portion of the clip.

19. The clip of claim 17 wherein the engagement surfaces on the nut body are configured to engage bearing surfaces on perimeter areas of the clip.

20. The clip of claim 17 wherein the engagement surfaces on the nut body are configured to engage bearing surfaces on a transition wall.

21. The clip of claim 17 wherein the engagement surfaces on the nut body are configured to engage walls forming cavities in the clip.

22. The clip of claim 9 wherein the nut element is a beam locking nut.

23. A clip comprising first and second nonmetal arms movable with respect to each other relative to a coupling portion coupling the first and second arms to each other and having first and second walls in the first and second arms, respectively, defining first and second openings aligned sufficiently with each other to receive a fastener element between the first and second openings, a third nonmetal portion extending from a second coupling portion on a side of the second arm opposite the first arm and having a wall for receiving a portion of a fastener element, first and second walls in the second coupling portion defining cavities in the second coupling portion for receiving respective portions of a fastener element, and a structure on the second arm extending in a direction away from the first arm and positioned on the second arm on a side of the second opening opposite the second coupling portion.

24. The clip of claim 23 wherein the first and second walls defining cavities define first and second openings through the second coupling portion positioned in the second coupling portion interior from lateral side edges of the second coupling portion.

25. The clip of claim 24 wherein the first and second openings through the second coupling portion are separated by a wall extending between the second arm and the third arm.

26. The clip of claim 23 wherein the structure on the second arm is substantially centered widthwise of the second arm.

27. The clip of claim 23 further including a nut element supported on the second arm between the second arm and the third arm, wherein the nut element includes first and second legs extending into the first and second cavities, and second and third legs extending on opposite sides of the structure.

28. The clip of claim 27 wherein the nut element includes a threaded portion extending within the opening in the third arm and wherein the opening in the third arm forms less than a completely closed perimeter.

29. A clip of claim 28 wherein the opening in the third arm includes an angled entrance surface extending to the opening in the third arm.

30. The clip of claim 23 wherein the clip is a monolithic structure.

31. A clip nut assembly comprising a clip and a nut wherein the clip includes first, second and third clip portions wherein the first and second clip portions extend from a first coupling portion and the second and third clip portions extend from a second coupling portion, first, second and third walls defining first, second and third openings in respective ones of the first, second and third clip portions substantially aligned with respect to each other, wherein the second coupling portion includes fourth and fifth walls defining fourth and fifth openings in the second coupling portion, and wherein the second clip portion includes a boss extending from a surface of the second clip portion, wherein the nut includes a base portion having first and second legs extending into the fourth and fifth openings and separated by a wall in the clip between the fourth and fifth openings, and wherein the base portion further includes third and fourth legs extending on different sides of the boss, and wherein pivoting of the nut about an axis substantially perpendicular to the base portion results in contact between a plurality of legs of the nut and laterally adjacent surfaces on the clip, and wherein the clip and nut are configured such that the nut can pivot relative to the clip and when the nut stops pivoting relative to the clip, surfaces on three different legs of the nut contact respective laterally adjacent surfaces on the clip.

* * * * *